United States Patent
Takahashi et al.

(10) Patent No.: US 8,381,782 B2
(45) Date of Patent: Feb. 26, 2013

(54) HEAVY DUTY PNEUMATIC TIRE

(75) Inventors: Shingo Takahashi, Kobe (JP); Satoshi Tsuda, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 1102 days.

(21) Appl. No.: 12/285,621

(22) Filed: Oct. 9, 2008

(65) Prior Publication Data

US 2009/0044890 A1 Feb. 19, 2009

Related U.S. Application Data

(62) Division of application No. 11/280,240, filed on Nov. 17, 2005, now Pat. No. 7,762,297.

(30) Foreign Application Priority Data

| Nov. 18, 2004 | (JP) | 2004-334903 |
| Nov. 19, 2004 | (JP) | 2004-336567 |
| Nov. 19, 2004 | (JP) | 2004-336568 |

(51) Int. Cl.
*B60C 11/11* (2006.01)

(52) U.S. Cl. ......... 152/209.18; 152/209.21; 152/209.22; 152/DIG. 3; 152/902

(58) Field of Classification Search ............. 152/209.18, 152/209.21, 209.22, DIG. 3, 902
See application file for complete search history.

(56) References Cited

U.S. PATENT DOCUMENTS

| 4,217,942 A * | 8/1980 | Takigawa et al. ............. 152/902 |
| 4,223,712 A * | 9/1980 | Iwata et al. ............. 152/209.22 |
| 4,619,300 A * | 10/1986 | Tokunaga et al. ............. 152/902 |
| 6,481,480 B1 * | 11/2002 | Schuster et al. ......... 152/209.22 |
| 2005/0211354 A1 * | 9/2005 | Shinmura et al. ........ 152/209.22 |

FOREIGN PATENT DOCUMENTS

| JP | 08-282213 A | * 10/1996 |
| JP | 10-035223 A | * 2/1998 |
| JP | 10-76812 A | 3/1998 |
| JP | 2000-177326 A | 6/2000 |
| JP | 2000-225813 A | * 8/2000 |
| JP | 2004-106747 A | 4/2004 |
| JP | 2004-203268 A | 7/2004 |

OTHER PUBLICATIONS

Machine translation for Japan 10-035223 (no date).*
Machine translation for Japan 2000-225813 (no date).*
Machine translation for Japan 08-282213 (no date).*

* cited by examiner

*Primary Examiner* — Steven D Maki
(74) *Attorney, Agent, or Firm* — Birch, Stewart, Kolasch & Birch, LLP

(57) ABSTRACT

It aims to provide a heavy duty pneumatic tire with block patterns and capable of improving deflected wear resisting performances without sacrificing wet grip performances or on-snow performances and that can particularly be favorably used for all seasons. The present invention comprises block patterns employing at least three types of blocks 4 comprised of central blocks 4C delimited by the central longitudinal groove 2M, the intermediate longitudinal grooves 2M, and the central lateral grooves 3C, intermediate blocks 4M delimited by the intermediate longitudinal grooves 2M, the outer longitudinal grooves 2S and the intermediate lateral grooves 3M, and outer blocks 4S that are delimited by outer longitudinal grooves 2S, outer lateral grooves 3S that extend from this outer longitudinal grooves 2S to the tread ends E, and wherein longitudinal length ratios (L4/W4) of blocks 4, groove width ratios of longitudinal grooves and lateral grooves (w2/w3), maximum widths of blocks, minimum widths of blocks and ratios thereof (W4max/W4min), and circumferential edge components and tire axial edge components and ratios thereof (EC/EL) at respective stages of wear are defined to be within specified ranges.

3 Claims, 10 Drawing Sheets

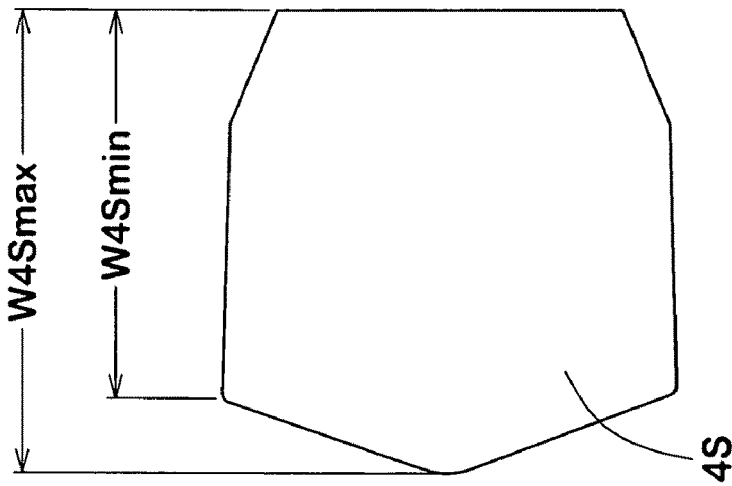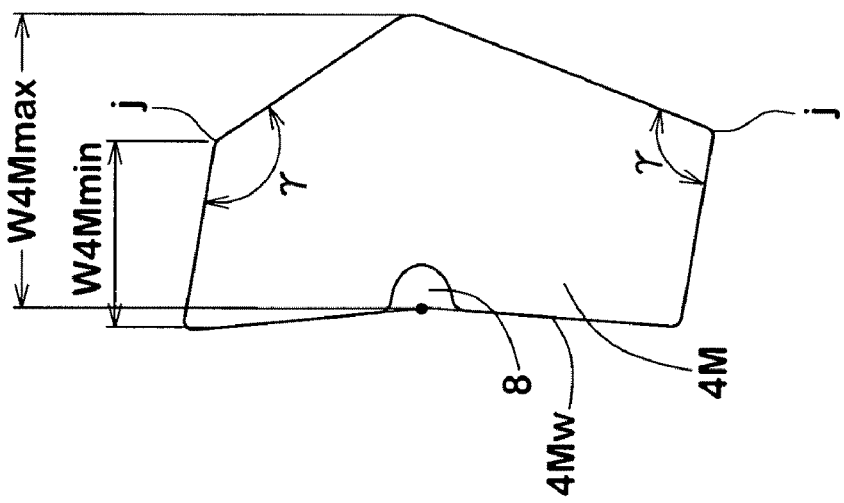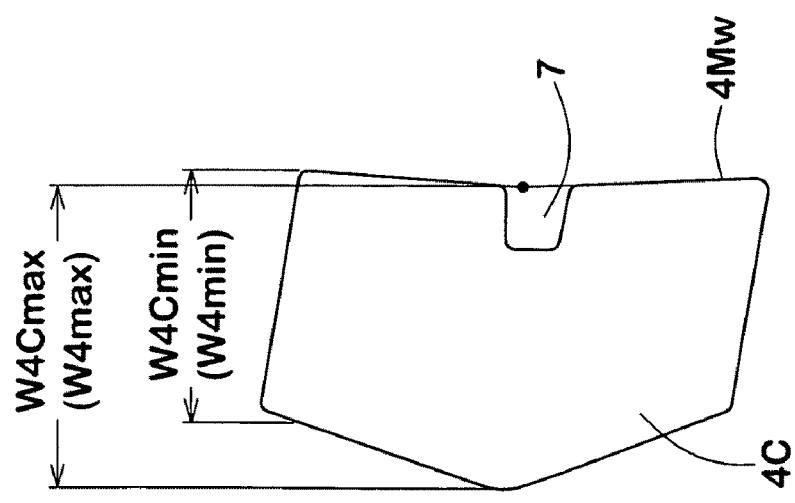

HEAVY DUTY PNEUMATIC TIRE

CROSS REFERENCE

This application is a Divisional of application Ser. No. 11/280,240 filed on Nov. 17, 2005 now U.S. Pat. No. 7,762,297, which claims priority on Application No. JP 2004-334903 filed in Japan on Nov. 18, 2004, Application No. JP 2004-336568 filed on Nov. 19, 2004 and JP 2004-336567 filed on Nov. 19, 2004. The entire contents of each of these applications is hereby incorporated by reference.

BACKGROUND OF THE INVENTION

The present invention relates to a heavy duty pneumatic tire of improved deflected wear resisting properties achieved by improving tread patterns.

Tires that can be used for all seasons are being desirable for use as heavy duty pneumatic tires that are employed for heavy vehicles such as trucks and busses. Such all-season heavy duty pneumatic tires are required to maintain high wet grip performances and steering stability performances for the aim of safe running on road surfaces of various conditions. For this purpose, block patterns are mainly employed as tread patterns in many cases.

On the other hand, it is the case with tires with block patterns, especially heavy duty pneumatic tires that large shear force acts on a first contacting side and last contacting side in a rotating direction during running or braking and sliding friction is generated between the tire and the road surface. So-called heel and toe wear (referred to as H/T wear) is accordingly apt to occur in which the first contacting side and the last contacting side in the rotating direction of the blocks are locally worn.

Japanese Patent Published Application 2004-106747 and Japanese Patent Published Application 2004-2032687 suggest providing tie bars between blocks as means for preventing such H/T wear. There has also been considered a means of prevention by setting a large land/sea ratio for increasing the rigidity of the tread surface. For instance, Japanese Patent Published Application 2000-177326 suggests a heavy duty pneumatic tire provided with shoulder blocks formed at shoulder portions being divided inside and outside in the tire axial direction and which is further provided with sipings including warped portions that warp in an outwardly convex manner.

With respect to tire performances, it is desired, in addition to the above performances, to restrict degradations accompanying progress of wear.

For instance, for restricting degradations in wet performances in a later term of wear, it is being suggested a) to form the tread rubber of a plurality of layers of different rubber compositions and b) to expose a rubber layer of high frictional force exhibiting wet skid performances on the tread surface in the later term of wear. However, problems are caused in such techniques that non-uniform exposure of the high frictional rubber layer caused through deflected wear. It will reversely harm the wet performances and causes a inter-layer peeling among the rubber layers.

In view of such circumstances, the inventors of the present invention have performed studies upon paying attention to compositional lengths of edges comprised by circumferential edges of the block portions (forming land portions) of tread patterns. It has consequently been found that the following points are important: (1) Edge components in the tire circumferential direction are considered to be particularly important in view of turning performances that are of special importance as wet performances. For maintaining such wet performances as high as those of new products, it is necessary to rather increase the edge component length in the tire circumferential direction accompanying the progress of wear;

(2) As for traction performances that are considered to be particularly important in view of on-snow performances, a) edge components in the tire axial direction are important and that b) it is preferable to increase such components accompanying progress of wear. However, on-snow performances are ensured up to 50% wear in case of winter tires. Accordingly, on-snow performance of tires that have exceeded 50% wear are not required to be maintained as high as wet performances of a new tire. Therefore, it would be sufficient to ensure tire axial edge components of not less than 0.5 times the edge component length of a new product;

(3) A ratio between edge component lengths in the tire circumferential direction and those in the tire axial direction should be balanced at respective stages of wear.

It has been found out that degradations in on-snow performances and wet performances accompanying progress of wear can be restricted low in these manners.

In this respect, Japanese Patent Published Application H10-76812 discloses a technique of restricting degradations in hydroplaning-resisting performances (wet performances) by increasing groove areas accompanying progress of wear.

BRIEF SUMMARY OF THE INVENTION

The object of the present invention is to provide a heavy duty pneumatic tire including block patterns and being capable of improving deflected wear-resisting performances without sacrificing wet grip performances or on-snow performances and that can be favorably used for all seasons.

Another object of the invention is to provide a heavy duty pneumatic tire capable of restricting degradations in on-snow performances and wet performances accompanying progress of wear to be low.

The present invention comprises block patterns employing at least three types of blocks comprised of central blocks delimited by the central longitudinal groove 2M, the intermediate longitudinal grooves 2M, and the central lateral grooves 3C, intermediate blocks 4M delimited by the intermediate longitudinal grooves 2M, the outer longitudinal grooves 2S and the intermediate lateral grooves 3M, outer blocks 4S that are delimited by the outer longitudinal grooves 2S and the outer lateral grooves 3S that extend from this outer longitudinal grooves 2S to the tread ends E.

The first invention further satisfies the following four equations.

$$(L4S/W4S) < (L4M/W4M) < (L4C/W4C)$$

$$1.50 < L4C/W4C < 1.80$$

$$1.30 < L4M/W4M < 1.65$$

$$0.90 < L4S/W4S < 1.10,$$

wherein a longitudinal length of the central blocks, which is a tire circumferential distance between most projecting endpoints on both sides of each central block in the tire circumferential direction, is defined as L4C, a longitudinal length of the intermediate blocks, which is a tire circumferential distance between most projecting endpoints on both sides of each intermediate block in the tire circumferential direction, as L4M, a longitudinal length of the outer blocks, which is a tire circumferential distance between most projecting endpoints on both sides of each outer block in the tire circumferential direction, as L4S, a lateral length of the central blocks, which is a tire axial distance between most projecting end points on both sides of each central block in the tire axial direction, as W4C, a lateral length of the intermediate blocks, which is a tire axial distance between most projecting end points on both sides of each intermediate block in the tire axial direction, as W4M, a lateral length of the outer blocks, which is a tire axial distance between most projecting end points on both sides of each outer block in the tire axial direction, as W4S, a longitudinal length ratio of the central blocks 4C as (L4C/W4C), a longitudinal length ratio of the intermediate blocks 4M as (L4M/W4M), and a longitudinal length ratio of the outer blocks 4S as (L4S/W4S), and satisfying the following three equations:

$$0.85<w2C/w3C<1.30$$

$$0.85<w2M/w3M<1.10$$

$$0.9<w2S/w3S<1.10,$$

wherein a groove width of the central longitudinal grooves 2C measured in a direction orthogonal to a groove central line is defined as w2C, a groove width of the intermediate longitudinal grooves 2M in the same direction as w2M, a groove width of the outer longitudinal grooves 2S in the same direction as w2S, a groove width of the central lateral grooves 3C in the same direction as w3C, a groove width of the intermediate lateral grooves 3M in the same direction as w3M, and a groove width of the outer lateral grooves 3S in the same direction as w3S.

The second invention further satisfies the following equations.

$$(W4Smax/W4Smin) < (W4Mmax/W4Mmin)$$
$$< (W4Cmax/W4Cmin)$$
$$1.00 \le W4Smax/W4Smin \le 1.20$$
$$1.15 \le W4Mmax/W4Mmin \le 1.40$$
$$1.40 \le W4Cmax/W4Cmin \le 1.70,$$

wherein a central block maximum width at which the tire axial width becomes maximum in a region of the central blocks 4C that is enclosed by the central longitudinal groove 2C and the intermediate longitudinal grooves 2M is defined as W4Cmax and a central block minimum width at which it becomes minimum as W4Cmin, an intermediate block maximum width at which the tire axial width becomes maximum in a region of the intermediate blocks 4M that is enclosed by the intermediate longitudinal grooves 2M and the outer longitudinal grooves 2S is defined as W4Mmax and an intermediate block minimum width at which it becomes minimum as W4Mmin, and an outer block maximum width at which the tire axial width becomes maximum in a region of the outer blocks 4S that is enclosed by the outer longitudinal grooves 2S and the tread ends E is defined as W4Smax and an outer block minimum width at which it becomes minimum as W4Smin.

The third invention further satisfies the following equations.

$$EC50>EC00 \qquad (1)$$

$$EC90>EC00 \qquad (2)$$

$$EL50>0.5 \times EL00 \qquad (3)$$

$$EL90>0.5 \times EL00 \qquad (4)$$

$$1.5<EC50/EL50<2.2 \qquad (5)$$

$$2.5<EC90/EL90<3.5 \qquad (6),$$

In the inventions, the number of longitudinal grooves is defined to be at least 5 for improving wet grip performances.

In the first invention, ratios between circumferential lengths and tire axial lengths of blocks that contribute to the rigidity of the blocks in the circumferential direction and the rigidity of the blocks in the tire axial direction are rationalized in accordance with central, intermediate and outer blocks. With this arrangement, traction performances and steering stability can be improved while groove alignments around the blocks can be made favorable such that drainage can be improved for improving wet grip performances. Moreover, values of ratios of groove widths of longitudinal grooves that affect wet turning performances and groove widths of lateral grooves that affect traction/brake performances are rationalized in accordance with the central, intermediate and outer blocks.

In the second invention, a block width variable rates of blocks that are closer to the tire equator and which are exposed to force acting in the tire circumferential direction are defined to be relatively large. This is due to the fact that H/T wear occurs less at such regions. This serves to improve traction performances. The outer blocks assume rectangular shapes for securing driving force of the tires and steering stability.

In other words, the central blocks are generally the first to ground from among the blocks when the vehicle is performing normal straight ahead running. The residence time with the grounding surface is long and the grounding pressure is large. Accordingly, wiping effects in which water films are torn and scraped out can be set large by setting a ratio between a maximum width and a minimum width large when running on wet road surfaces. At shoulder portions having a large sliding amount in the tire circumferential direction, the ratio between the maximum width and the minimum width of the blocks is set small for restricting occurrence of H/T wear. By further setting the block width variable ratio to be small, it is possible to ease differences in wear energy distribution on the first contacting side and the last contacting side, and it is possible to restrict non-uniformity in wear energy that cause occurrence of H/T wear of other blocks.

In the third invention, it is possible to restrict degradations in on-snow performances and wet performances accompanying progress of wear to be low.

BRIEF DESCRIPTION OF THE SEVERAL VIEWS OF THE DRAWINGS

FIG. 5 is an another plan view representing details of a central block;

FIG. 6 is an another plan view representing details of an intermediate block;

FIG. 7 is an another plan view representing details of a shoulder block;

FIG. 9 is a sectional view of an intermediate lateral groove, wherein

DETAILED DESCRIPTION OF THE INVENTION

Figure 1:
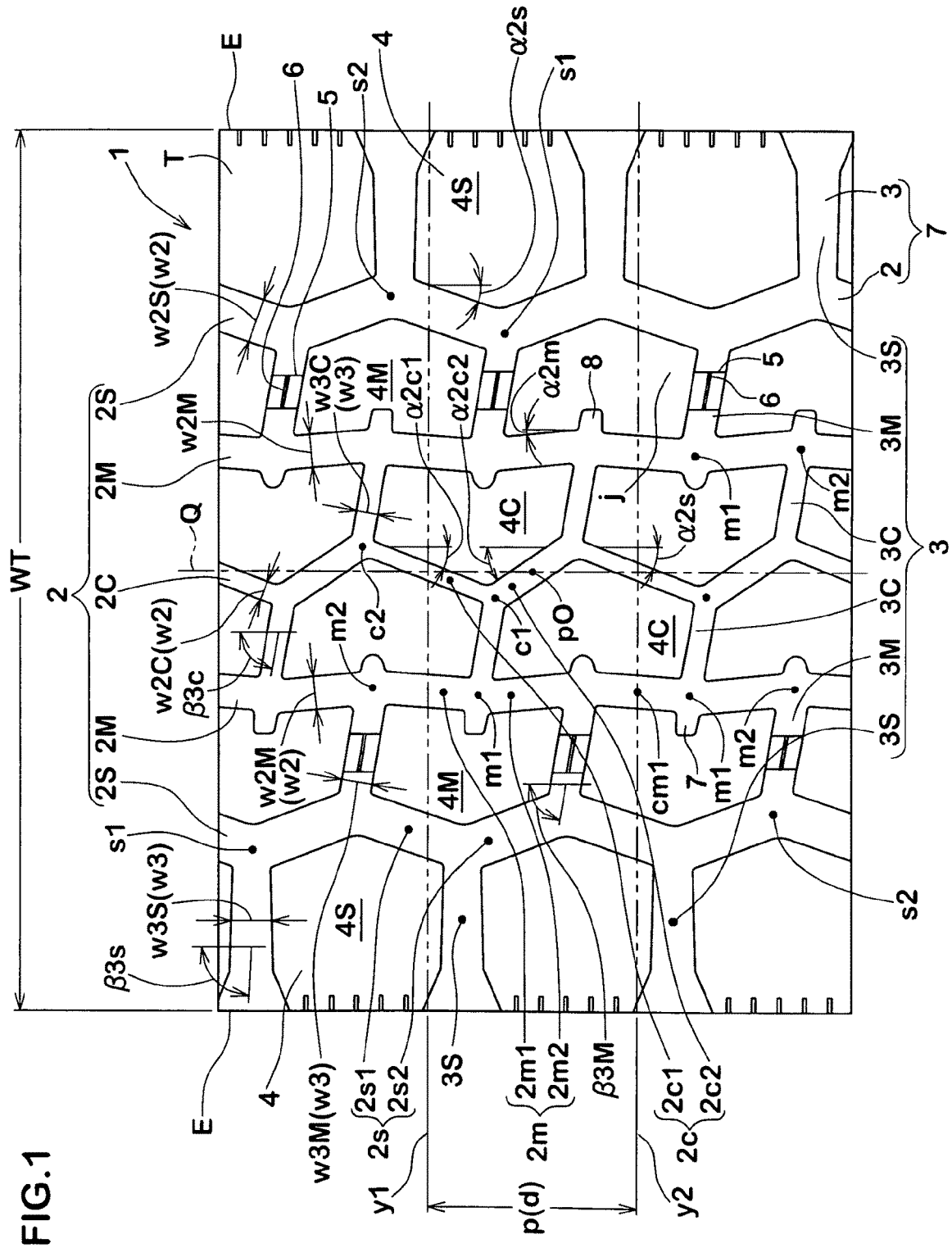
FIG. 1 is a planar development view illustrating a tread pattern according to one embodiment of the present invention.

One embodiment of the present invention will now be explained on the basis of the drawings. FIG. 1 is a planar development view illustrating a tread pattern of a tread portion in which a tread portion of the heavy duty pneumatic tire of the present invention (hereinafter also simply referred to as "tire") has been developed in a planar manner. A tread surface TS between tread ends E, E of a tire 1 is comprised of a single or a plurality of radii of curvature in a section (not shown) including a tire axis. The tread surface TS is provided with tread grooves 7 comprised of a plurality of longitudinal grooves 2 extending in the tire circumferential direction and a plurality of lateral grooves 3 extending in direction intersecting with these longitudinal grooves 2 so as to partition the tread surface TS into blocks 4. In this respect, the tread end E is defined, where the tread surface TS intersects with a buttress surface forming an edge, the edge is defined as the tread end E, and where the tread surface TS and the buttress intersects in an arc-like manner, an intersecting point between an extension surface of the tread surface TS and an extension surface from the buttress surface is defined as the tread end E.

The longitudinal grooves 2 include at least 5 grooves, namely a central longitudinal groove 2C intersecting a tire equator Q and extending in the tire circumferential direction in a zigzag manner, outer longitudinal grooves 2S outside in a tire axial direction, those of the present embodiment extending in the tire circumferential direction in a zigzag manner, and intermediate longitudinal grooves 2M extending between the central longitudinal groove 2C and the outer longitudinal grooves 2S in the tire circumferential direction in a zigzag manner. By providing not less than 5 longitudinal grooves 2 in the circumferential direction like this, it is possible to improve wet grip performances.

The lateral grooves 3 include central lateral grooves 3C that joint the central longitudinal groove 2C with the intermediate longitudinal grooves 2M, intermediate lateral grooves 3C that joint the intermediate longitudinal grooves 2M with the outer longitudinal grooves 2S, and outer lateral grooves 3S that extend from the outer longitudinal grooves 2S to the tread ends E.

Accordingly, the blocks 4 include at least three types of blocks 4 comprised of central blocks 4C delimited by the central longitudinal groove 2M, the intermediate longitudinal grooves 2M, and the central lateral grooves 3C, intermediate blocks 4M delimited by the intermediate longitudinal grooves 2M, the outer longitudinal grooves 2S and the intermediate lateral grooves 3M, and outer blocks 4S that are delimited by outer longitudinal grooves 2S, outer lateral grooves 3S and the tread ends E, and the tread surface TS is formed as block patterns.

The block patterns are comprised of repetitive patterns of pattern units d. For instance, the pattern located between the upper and lower pitch lines y1, y2 extending in the tire axial direction above (in the drawing) the respective outer lateral grooves 3S, 3S shown on the left end of FIG. 1 is defined to be a pattern unit d of repetition. A tire circumferential length of the pattern unit d is denoted as pitch p, and this embodiment is arranged to disperse noise frequencies by employing block patterns of so-called variable pitch method. In the method, a plurality of different types of pattern units d in which a length of the pitch p are ranging from approximately 1.0 to 1.3 times.

As illustrated in FIG. 1, the tire equator Q and the central longitudinal groove 3C intersect at a pitch central position p0. The respective pattern units d comprise a point symmetric pattern with this pitch central point p0 in this embodiment. It is alternatively possible to employ various patterns such as those of line symmetric shapes.

The central longitudinal groove 2C is comprised of a circumferentially repetitive body of dogleg grooves 2c with peaks c1 projecting to the left in FIG. 1 (in the present descriptions, peaks projecting to the left are referred to as the first peaks and the peaks projecting to the right as the second peaks where required. In this respect, positions such as the peaks are positions at the groove center line and angles are with respect to the center line). The dogleg grooves 2c are comprised of upper inclined pieces 2c1 upward in FIG. 1 and lower inclined pieces 2c2.

The intermediate longitudinal grooves 2M on both sides of the tire equator Q are comprised of circumferentially repetitive bodies of dogleg grooves 2m, with peaks m1 (first peaks) projecting to the left. The dogleg grooves 2m are comprised of upper inclined pieces 2m1 located upward and lower inclined pieces 2m2. The central longitudinal grooves 2M on both sides are formed to have identical phases.

Similar to the central and intermediate longitudinal grooves 2C, 2M, the outer longitudinal grooves 2S are comprised of circumferentially repetitive bodies of dogleg grooves 2s with peaks s1 projecting to the left and peaks s2 projecting to the right in FIG. 1. The dogleg grooves 2s are comprised of upper inclined pieces 2s1 located upward and lower inclined pieces 2s2.

In this respect, respective first peaks and second peaks of the longitudinal grooves 2C, 2M and 2S are respectively aligned at the same positions in the tire axial direction and on the same tire circumferential line.

The central blocks 4C on the one side assume a horizontal tail-like shape when seen in a planar view with projections comprised by the second peaks c2 of the central longitudinal grooves 2C, and the central blocks 4C on the other side assume a horizontal tail-like shape with projections comprised by the first peaks c1 of the central longitudinal grooves 2C.

The intermediate blocks 4M on the one side assume a horizontal tail-like shape when seen in a planar view with projections comprised by the first peaks s1 of the outer longitudinal grooves 2S, and the intermediate blocks 4M on the other side assume a horizontal tail-like shape with projections comprised by the second peaks s2 of the outer longitudinal grooves 2S.

Further, the outer blocks 4S on one tire axial direction side assume a home plate-like shape with projections comprised by the second peaks s1 of the outer longitudinal grooves 2S while the outer blocks 4S on the other side assume a home plate-like shape with projections comprised by the first peaks s1 of the outer longitudinal grooves 2S.

An inclination angle α2c1 on an acute angle side which the upper inclined pieces 2c1 of the central longitudinal groove 2C forms with respect to the tire circumferential line (parallel to the tire equator Q) is defined to be 15 to 35°, and preferably 20 to 30°. An inclination angle α2c2 of the lower inclined pieces 2c1 is defined to be approximately 30 to 45°, and preferably 20 to 35°. With this arrangement, it is possible to improve grip performances and steering stability.

On the other hand, an inclination angle α2s on an acute angle side of the outer longitudinal grooves 2S is identical to those of the upper inclined pieces 2s1 and the lower inclined pieces 2s2 of the dogleg grooves 2s and thus approximately 20 to 40°. It is preferable that it is larger than the inclination angle a2c1 of the upper inclined piece 2c1 of the central longitudinal groove 2C and smaller than the inclination angle a2c2 of the lower inclined piece 2c2.

An inclination angle α2m on an acute angle side which the intermediate longitudinal grooves 2M form with respect to the tire circumferential line is identical to those of the upper inclined pieces 2m1 and the lower inclined pieces 2m2 of the dogleg grooves 2m and is set to be relatively small in view of drainage. In the present embodiment, it is formed to be approximately 1 to 15°, and preferably 2 to 8°. This angle is smaller than the angles α2c (average value of the upper and lower inclined pieces), α2s of the central longitudinal groove 2C and the outer longitudinal grooves 2S with respect to the tire circumferential direction. With this arrangement, water accumulated between the tread surface TS at the tire central portions and the tire shoulder portions and the road surface can be easily drained in the tire circumferential direction for improving wet grip performances.

On the left-hand side of the tire equator Q in FIG. 1, the central lateral grooves 3C joint the first peaks c1 of the central longitudinal groove 2C with the first peaks m1 of the intermediate longitudinal grooves 2M. The intermediate lateral grooves 2M joint the second peaks m2 of the intermediate longitudinal grooves 2M with the second peaks s2 of the outer longitudinal grooves 2S. The outer lateral grooves 3S extend from the first peaks S1 of the outer longitudinal grooves 2S to the tread ends E.

On the right-hand side, the central lateral grooves 3C joint the second peaks c2 of the central longitudinal groove 2C with the second peaks m2 of the intermediate longitudinal grooves 2M. The intermediate lateral grooves 2M joint the first peaks m1 of the intermediate longitudinal grooves 2M with the first peaks s1 of the outer longitudinal grooves 2S. The outer lateral grooves 3S extend from the second peaks s2 of the outer longitudinal grooves 2S to the tread ends E. As a result, combination blocks in which central blocks 4C, 4C face each other with the tire equator Q between can be formed between the intermediate longitudinal grooves 2M, 2M so as to improve rigidity and drainage, and thus to exhibit steering stability.

Further, the central lateral grooves 3C and the intermediate lateral grooves 3M incline in the same direction, for instance, in a direction with which the left-hand side becomes the top, and inclination angles b3c, b3m on an acute angle side formed with respect to the tire circumferential line are defined to be identical in the present embodiment, and particularly in the range that is smaller than 50° to 90°, preferably in the range of 65 to 85°. A corresponding angle b3s of the outer lateral grooves 3S is set within a range of approximately ±80°, and preferably in a range of ±84° with respect to the tire circumferential line.

In this respect, block patterns of the respective longitudinal grooves 2 and lateral grooves 3 are preferably arranged such that they are point symmetric with respect to a center comprised by the central points p0 of the lower inclined pieces 2c2 of the central longitudinal groove 2C in each pattern unit d whereby the drainage is improved to thus improve the wet grip performance, and variations on the right and left are eliminated for improving steering stability.

Sides facing the intermediate longitudinal grooves 2M of the central blocks 4C and sides facing the intermediate longitudinal grooves 2M of the intermediate blocks 4M are formed with concave portions 7, 8 obtained by notching the blocks at centers of respective sides. With this arrangement, primary retentions of water are formed so as to improve drainage performances and to improve traction performances.

Figure 4:
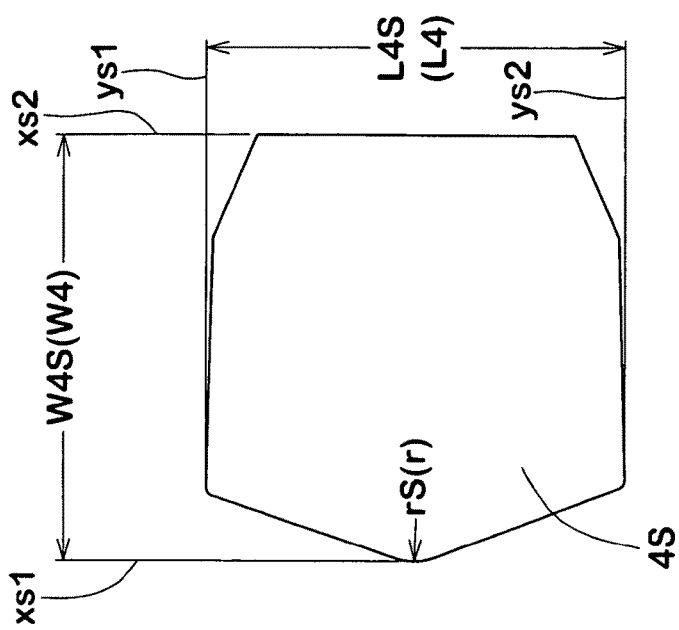
FIG. 4 is a plan view illustrating the outer block in an enlarged manner.
Figure 3:
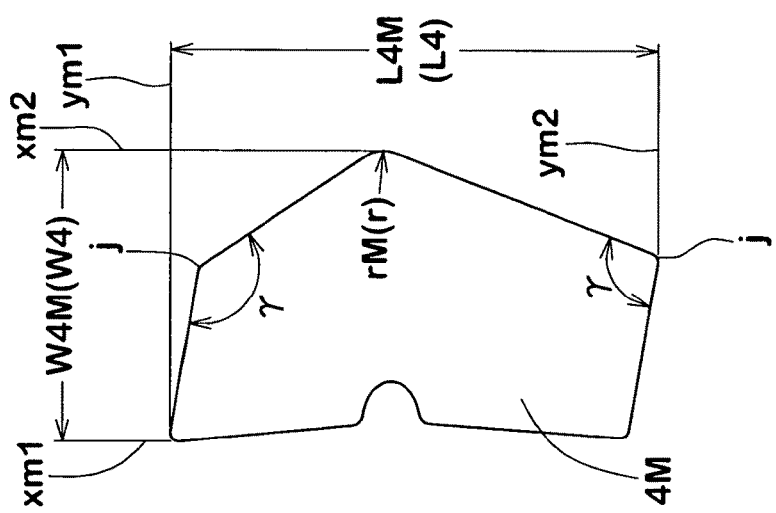
FIG. 3 is a plan view illustrating the intermediate block in an enlarged manner.
Figure 2:
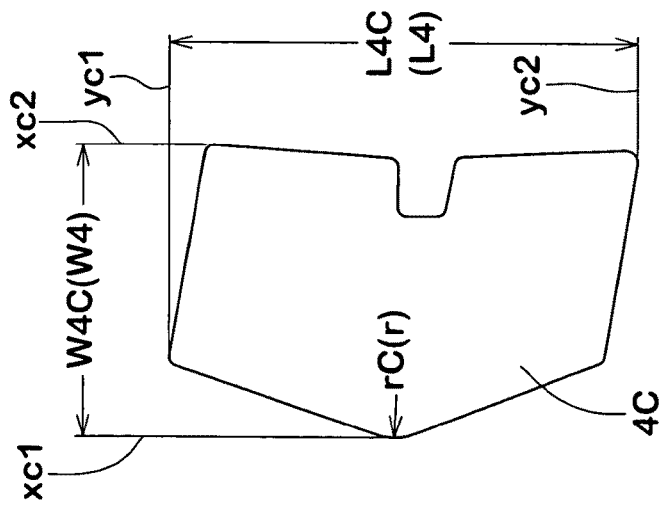
FIG. 2 is a plan view illustrating the central block in an enlarged manner.

The central block 4C is illustrated in FIG. 2, the intermediate block 4M in FIG. 3, and the outer block 4S in FIG. 4, respectively in enlarged form.

In each of the blocks 4, distances between two tire axial lines yc1 and yc2, ym1 and ym2, and ys1 and ys2 that respectively extend in the tire axial direction and pass through upper and lower most projecting ends in the tire circumferential direction, that is, respective tire circumferential distances of the central, intermediate and outer blocks 4 are referred to as the central block longitudinal length L4C, the intermediate block longitudinal length L4M, and the outer block longitudinal length L4S.

That is:

a longitudinal length of the central blocks, which is a tire circumferential distance between most projecting end points on both sides of each central block in the tire circumferential direction, is defined as L4C;

a longitudinal length of the intermediate blocks, which is a tire circumferential distance between most projecting end points on both sides of each intermediate block in the tire circumferential direction, as L4M; and a longitudinal length of the outer blocks, which is a tire circumferential distance between most projecting end points on both sides of each outer block in the tire circumferential direction, as L4S.

On the other hand, tire axial distances between tire circumferential lines xc1 and xc2, xm1 and xm2, and xs1 and xs2 that extend in the tire circumferential direction and respectively pass through on both sides of the most projecting ends in the tire axial direction of the central, intermediate and outer blocks 4 are referred to as the central block lateral length W4C, the intermediate block lateral length W4M, and the outer block lateral length W4S.

That is:

a lateral length of the central blocks, which is a tire axial distance between most projecting end points on both sides of each central block in the tire axial direction, is defined as W4C;

a lateral length of the intermediate blocks, which is a tire axial distance between most projecting end points on both sides of each intermediate block in the tire axial direction, as W4M; and a lateral length of the outer blocks, which is a tire axial distance between most projecting end points on both sides of each outer block in the tire axial direction, as W4S.

And in the ratio of L4/W4 satisfies the following four equations:

$$(L4S/W4S)<(L4M</W4M)<(L4C/W4C)$$

$$1.50<L4C/W4C<1.80$$

$$1.30<L4M/W4M<1.65$$

$$0.90<L4S/W4S<1.10,$$

In this manner, the longitudinal length ratio L4/W4 of the blocks 4 is defined to become smaller in approaching from the central blocks 4C to the outer blocks 4S. As a result, the degree of block longitudinal lengths is relatively reduced such that the shapes come closer to a square. The longitudinal length L of the respective blocks 4 corresponds to a length obtained by subtracting respective groove widths W3 of the upper or lower lateral grooves 3 of the respective blocks 4 from the pitch p of the pattern units d. Accordingly, the longitudinal length ratio of the blocks (L4/W4) is correlated to the tire axial lengths of the lateral grooves 4, and the shorter the length becomes, the larger the longitudinal length ratio L/W will be.

Incidentally, it is generally the case with a heavy duty pneumatic tire that central portions of the tire, that is, crown portions first ground and thereafter the intermediate portions or the shoulder portions ground. Accordingly, water accumulated between the tread surface TS and the road surface will flow from central portions of the tread to both sides in the tire axial direction on wet road surfaces. At this time, a shorter tire axial length for the central lateral grooves 3C will be more favorable in view of drainage.

Moreover, in view of force acting on the central block 4C, force in the tire circumferential direction is larger than force in the tire axial direction. Accordingly, the central blocks 4C are made to be of longitudinally elongated shape where the tire circumferential direction is located vertically while the tire axial direction is located horizontally as in FIG. 1 so as to improve traction performances and effects of restricting deflected wear of the blocks.

On the other hand, since the tread surface TS of the tire inevitably includes a curvature, the sliding amount of the shoulder portions is generally larger than that of the tire central portions. The outer lateral grooves 3S thus highly exhibit so-called wiping effects of scraping water films out that are formed on the road surface. An arrangement in which the length is longer in the tire axial direction when compared to the central lateral grooves 3C is accordingly more favorable for improving wet grip performances. Moreover, lateral force acting on the outer blocks 4S is larger than lateral force acting on the central blocks 4C. This becomes particularly remarkable when performing turning, and lateral rigidity of the outer blocks 4S largely effect steering stability performances. It is thus preferable to employ a longitudinally elongated shape as in FIG. 1 in view of wet grip performances and steering stability performances. In this respect, since the intermediate blocks 4M are required to exhibit properties intermediate of those of the central blocks 4C and the outer blocks 4S, shape properties are also required to be intermediate.

Preferably, $$1.60<L4C/W4C<1.70$$

$$1.40<L4M/W4M<1.55$$

$$0.95<L4S/W4S<1.05$$

Moreover, a groove width of the central longitudinal grooves 2C measured in a direction orthogonal to a groove central line is defined as w2C, a groove width of the intermediate longitudinal grooves 2M in the same direction as w2M, a groove width of the outer longitudinal grooves 2S in the same direction as w2S, a groove width of the central lateral grooves 3C in the same direction as w3C, a groove width of the intermediate lateral grooves 3M in the same direction as w3M, and a groove width of the outer lateral grooves 3S in the same direction as w3S, the ratio of w2/w3 satisfies the following equations:

$$0.85<w2C/w3C<1.30$$

$$0.85<w2M/w3M<1.10$$

$$0.9<w2S/w3S<1.10$$

This means that the groove width w2 of the longitudinal grooves 2 and the groove width w3 of the lateral grooves 3 joining on thereto are set to be substantially identical. This is because it has been found that it is favorable for promoting water flow within grounding surfaces when performing straight-ahead running and turning and for improving performances of resisting deflected wear. The range of such difference is set to ±10%, and preferably in a range of not less than 0.94 and not more than 1.06.

From among the groove width w2C of the central longitudinal groove 2C, the groove width w2M of the intermediate longitudinal grooves 2M and the groove width w2s of the outer longitudinal grooves 2S, those that come closer to the tread ends E will be larger, that is, the following equation is satisfied.

$$w2C<w2M<w2S$$

The grounding pressure of a tire becomes generally maximum at the equator surface when the vehicle is running straight-ahead or halting and becomes gradually smaller in coming closer to the tread ends. The grip performance is thus high, and the wear-resisting performances are favorable to be enlarged the actual grounding area of the central portions becomes in case of a dry road surface. In case of a wet road surface, while the wet grip performance becomes higher the larger the width of the longitudinal grooves 2 becomes, an increase in the groove width w2 of the longitudinal grooves 2 of the central portions will badly affect the above performances. For improving both of such conflicting performances, the lateral groove width w2 is set to satisfy the above relationship. In this respect, the dogleg grooves 2c of the central longitudinal groove 2C is arranged that the groove width w2C2 of the lower inclined pieces 2C2 is set to be larger than the groove width w2C1 of the upper inclined pieces 2C1 by approximately 1.05 to 1.60 for achieving favorable water flow. For instance, the groove width w2C1 may be set to 4 mm and the groove width w2C2 to 6 mm. In this respect, the groove width w2C of the central longitudinal groove 2C is defined to be an average groove width value of the entire length.

In this respect, the ratios of the grounding width WT of the tread portion to the groove widths w2 of the longitudinal grooves 2 are set to be as follows. The grounding width wt is an exploded length between tread ends E, E.

$$0.020 \leq (w2C/WT) \leq 0.040$$

$$0.025 \leq (w2M/WT) \leq 0.045$$

$$0.040 \leq (w2S/WT) \leq 0.060$$

Due to the same reasons, the groove widths w3 of the lateral grooves (groove width w3C of the central lateral grooves 3C, groove width w3M of the intermediate lateral grooves 3M, groove width w3S of the outer lateral grooves 3S) are set as follows.

$$w3C < w3M < w3S$$

Under the relationship as discussed above, the widths are set to the following ranges with respect to the grounding width WT in a normal condition.

$$0.015 \leq (w3C/WT) \leq 0.035$$

$$0.030 \leq (w3M/WT) \leq 0.050$$

$$0.035 \leq (w3S/WT) \leq 0.055$$

By setting the groove widths w3 of the lateral grooves 3 to become larger in approaching the tread ends, the flow of water within the grounding surface flowing from the equator surface towards the tread ends can be promoted to improve wet grip performances, and effects similar to those of the longitudinal grooves 2 can be exhibited.

In this respect, values of the respective block longitudinal lengths L, the block lateral length W, and the groove widths w and reference positions thereof are values measured on tread surfaces T in a normal internal pressure condition in which the tire is assembled to a normal rim and is applied with normal internal pressure, and when the tread surface TS intersects with the groove walls via arc-like portions, values obtained at positions of intersecting lines in extended straight planes thereof. Here, the term "normal rim" denotes a rim defined in accordance with one of a normal rim according to JATMA, a "design rim" according to TRA and a "measuring rim" according to ETRTO, and the term "normal internal pressure" denotes an air pressure that is defined in accordance with one of a maximum air pressure according to JATMA, a maximum value as recited in the table of "tire load limits at various cold inflation pressures" according to TRA, and "inflation pressure" according to ETRTO. The term "normal load" denotes maximum load corresponding to the normal internal pressure according to each standard. Where fluctuations are found in central line directions in groove widths or similar, an average value is employed.

In the present embodiment, the groove depth of the central longitudinal groove 2C and the lateral grooves 3C is approximately 11.0 to 20.0 mm, and the groove depth of the outer longitudinal grooves 2S is deeper than the central longitudinal groove 2C by 0.2 to 5.0 mm, and the depth of outer lateral groove 3S are shallower than the lateral grooves 3C by approximately 7.0 to 13.0 mm. The depths are set to full depths in which tread patterns of the longitudinal grooves 2 and lateral grooves 3 clearly remain also in the end stage of wear (at least 50% depth wear). In this respect, the groove widths of the groove bottoms are set to be 50 to 90% of the groove widths on the tread surface (surface width ratio). With such arrangement, it is possible to solve the problems of wet grip performance and steering stability (particularly straight-ahead running stability) by securing edge components in the end stage and by improving the block rigidity of the crown portions.

With respect to the intermediate blocks 4M, an angle g of an intersecting point j of a side facing the outer longitudinal grooves 2S and a side facing the intermediate lateral grooves 3M is maintained at an obtuse angle upward and downward in the drawing for preventing a punching wear. The tire axial width of the intermediate blocks 4M is set to be uniform in the tire circumferential direction, for instance, such that the ratio of the maximum value with respect to the minimum value is approximately 1.0 to 1.3. As the results, reductions in heel and toe wear is aimed by uniformizing the rigidity on the first contacting side and the last contacting side.

Further, deflected wear is prevented by forming the respective projecting end portions of the respective blocks 4C, 4M and 4S that project in the tire axial direction to be of arc-like shape at a radius of curvature r. The respective radii of curvature rC, rM and rS (hereinafter generally referred to as r in the equations) of the blocks 4C, 4M and 4S are preferably set to be in the range of 0.05 to 0.30 times of r coefficients (r4C, r4M, r4S) of the respective blocks 4C, 4M and 4S that can be obtained by the following equation. In this respect, L denotes the block longitudinal lengths of the respective blocks and W denotes the block lateral lengths of the respective blocks.

$$r \text{ coefficient} = r/(L \times W)^{0.5}$$

This is because where the value is less than 0.05, the above-described effects of preventing chipping of blocks or deflected wear will be small while where it exceeds 0.30, wiping effects of the block edges within wet road surface will be decreased.

Next, in the second invention as illustrated in FIGS. 5 to 7, the following equations are satisfied.

$$(W4S\max/W4S\min) < (W4M\max/W4M\min)$$
$$< (W4C\max/W4C\min)$$
$$1.00 \leq W4S\max/W4S\min \leq 1.20$$
$$1.15 \leq W4M\max/W4M\min \leq 1.40$$
$$1.40 \leq W4C\max/W4C\min \leq 1.70,$$

wherein a central block maximum width at which the tire axial width becomes maximum in a region of the central blocks 4C that is enclosed by the central longitudinal groove 2C and the intermediate longitudinal grooves 2M is defined as W4Cmax and a central block minimum width at which it becomes minimum as W4Cmin, an intermediate block maximum width at which the tire axial width becomes maximum in a region of the intermediate blocks 4M that is enclosed by the intermediate longitudinal grooves 2M and the outer longitudinal grooves 2S is defined as W4Mmax and an intermediate block minimum width at which it becomes minimum as W4Mmin, and an outer block maximum width at which the tire axial width becomes maximum in a region of the outer blocks 4S that is enclosed by the outer longitudinal grooves 2S and the tread ends E is defined as W4Smax and an outer block minimum width at which it becomes minimum as W4Smin.

In this respect, the block maximum width and the block minimum width are measured at intersecting points of extensions of respective groove walls 4Mw facing the intermediate longitudinal grooves 4M at sides facing the concaved intermediate grooves 4M. The concave portions 7, 8 are ignored at this point.

The above (W4Smax/W4Smin), (W4Mmax/W4Mmin), (W4Cmax/W4Cmin) indicate variable rates of the tire axial widths at the respective blocks 4. The central blocks 4C close to the tire equator Q at which force acting in the tire circumferential direction is large while drag is small, and the H/T wear is relatively small are defined to have a larger variable rate than those of the remaining blocks. In other words, the zigzag degree of the central longitudinal groove 2C is increased. With this arrangement, the longitudinal/lateral rigidity of, for instance, the central portions in the tire circumferential direction of the blocks is increased to improve grip performance and steering stability.

Setting a large variable rate also contributes to improvements in traction performances. On the other hand, a small ratio (W4Smax/W4Smin) is set for the outer blocks 4S closer to the tread ends E at which force in the axial direction is large. The blocks are made to assume a shape close to a rectangle for uniformizing wear energy in the tire circumferential direction for reducing H/T wear while also improving driving force of the tire and steering stability.

More particularly, the central blocks 4C are generally the first to ground from among the blocks when performing normal straight-ahead running and the time during which they remain within the road surface is longest while the grounding pressure is also large. When performing running on a wet road surface with such blocks, wiping effect in which water films are torn and scraped out can be increased the larger the ratio between the maximum width and the minimum width (W4max/W4min) is so as to improve wet grip performances. On the other hand, since the slipping amount in the tire circumferential direction is large at the shoulder portions, heel and toe wear is apt to occur where the ratio between the maximum width and the minimum width of the blocks is large. In this respect, occurrence of H/T wear can be more easily prevented by setting the block maximum width proximate of central positions of the respective blocks in tire circumferential directions. Moreover, by setting tire axial widths of the intermediate blocks 4M to be uniform in the tire circumferential direction, for instance, by setting the ratio of the maximum value to the minimum value to the above values, the rigidity of the first contacting side and the later contacting side can be uniformized to achieve decreases in heel and toe wear.

H/T wear of the outer blocks 4S can not be prevented where W4Smax/W4Smin>1.20. In case of 1.15>W4Mmax/W4Mmin or 1.40>W4Mmax/W4Mmin, the wet grip performances are insufficient. In case of W4Cmax/W4Cmin<1.40 or W4Cmax/W4Cmin>1.70, H/T wear is apt to occur at the intermediate blocks 4M and the central blocks 4C.

It is preferable that $$1.05 \leq W4Smax/W4Smin \leq 1.10$$

$$1.20 \leq W4Mmax/W4Mmin \leq 1.30$$

$$1.50 \leq W4Cmax/W4Cmin \leq 1.60$$

In this respect, the maximum width W4Smax, W4Mmax and W4Cmax of the respective blocks with respect to the grounding width WT in a normal condition are set to be in the range of $$0.16 \leq W4Smax/WT \leq 0.20$$

$$0.12 \leq W4Mmax/WT \leq 0.16$$

$$0.11 \leq W4Cmax/WT \leq 0.15$$

The reason for setting such values is that when W4Smax/WT exceeds 0.20, H/T is worsened while when it is smaller than 0.16, SH shoulder drop wear is caused. Where W4Mmax/WT exceeds 0.16, H/T is worsened while when it is smaller than 0.12, second punching wear is caused. Where W4Cmax/WT exceeds 0.15, H/T is worsened while when it is smaller than 0.11, punching wear is caused.

Here, the term "grounding width in normal condition WT" denotes a maximum width of the grounding surface where normal load is applied in a condition in which the tire is assembled to a normal rim and is filled with normal internal pressure.

By employing the above arrangement, it is possible to restrict deflected wear caused through sliding in the tire circumferential direction while restricting degradations in other performances. However, since rib punching that cause early wear is apt to occur at the entire intermediate block 4M row, it is preferable to further restrict such deflected wear at the intermediate blocks 4M.

Figure 9B:
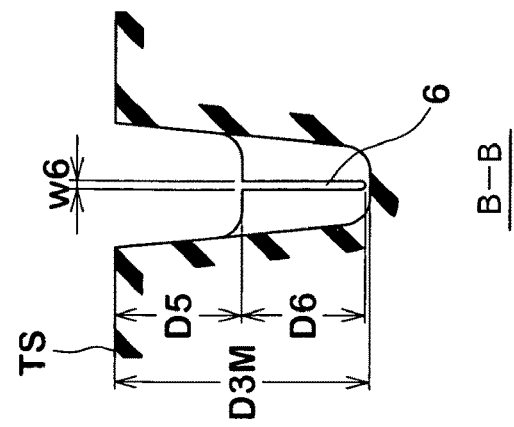
FIG. 9(b) is a sectional view along line B-B.
Figure 9A:
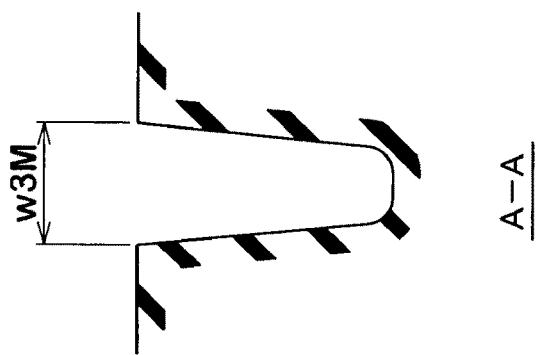
FIG. 9(a) is a sectional view along line A-A of FIG. 5
Figure 8:
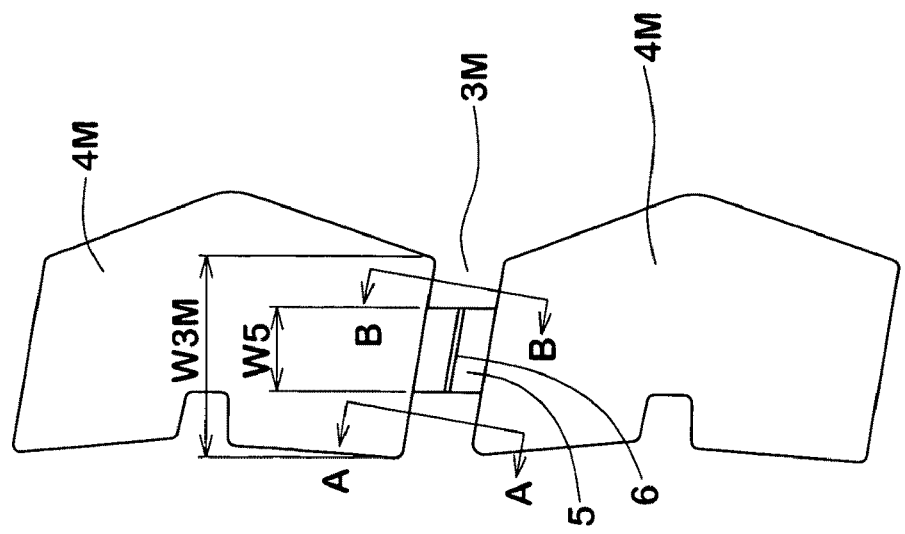
FIG. 8 is a plan view representing intermediate blocks, intermediate lateral grooves and a tie bar.

For this purpose, tie bars 5 as illustrated in FIG. 1 and others are provided within intermediate lateral grooves 3M between the intermediate blocks 4M, 4M. FIG. 8 illustrates a partially enlarged view of the intermediate blocks 4M, 4M and intermediate lateral grooves 3M therebetween, FIG. 9(A) is a section along A-A in FIG. 8, and FIG. 9(B) is a section along B-B. The tie bars 5 protuberate from the groove bottoms at substantially central portions in the tire axial direction of the intermediate lateral grooves 3M to joint the groove walls of the intermediate blocks 4M, 4M. With these tie bars 5, movements of the intermediate blocks 4M in the tire circumferential direction are restricted to thus decrease the wear energy so that occurrence of the above-described deflected wear can be restricted.

A tire axial distance W5 of the tie bar 5 is defined to be not less than 20% and not more than 65% of the tire axial length W3M of the intermediate lateral grooves 3M. Where it is less than 20%, effects of the tie bars will be insufficient while when it exceeds 65%, it will apt to badly affect wet grip performances. The tie bar depth D5 which is given as the distance from the tread surface TS to the tie bar 5 surface in the tire radial direction is defined to be not less than 25% and not more than 70% of the average groove depth D3M of the intermediate lateral grooves 3M. Where it is less than 25%, effects of the tie bars cannot be exhibited while when it exceeds 70%, the wet grip performances are apt to be badly affected.

Moreover, the tie bars 5 comprise sipings 6. The sipings 6 may be a notch with a width w6 that is not more than 1 mm, and May be substantially 0 mm. With this arrangement, it is prevented that effects of the tie bars of improving circumferential rigidity of the intermediate blocks 4M are reduced. It further improves effects of tearing water films through minute opening and closing within grounding surfaces. Where the width exceeds 1 mm, effects of the tie bars are reduced. It is further possible to restrict degradations in wet grip performances when wear has progressed and the tie bars appear on the tread surface such that the intermediate blocks 4M are interlinked. The depth D6 of the sipings is defined to be not less than 50% and not more than 100% of the difference between the average groove depth of the intermediate lateral grooves 3M and the tie bar depth (D3M-D5). Where it is less than 50%, effects of the sipings cannot be exhibited. When it exceeds 100%, that is, when the ends of the sipings are located inward in the tire radial direction than the bottoms of the intermediate lateral grooves 3M, effects of the tie bars of improving the rigidity of the intermediate blocks 4M in the tire circumferential direction will be reduced.

In the present embodiment, the groove depth is 15 to 20.0 mm as said before, preferably to be approximately 15 to 18 mm for the central longitudinal groove 2C and the lateral grooves 3C. The groove depth of the outer longitudinal grooves 2S and the lateral grooves 3S is defined to be deeper than the groove depth of the central longitudinal groove 2C and the lateral grooves 3S by approximately 0 to 20.0 mm. With this arrangement, the depth is set to be a full depth in which the tread patterns of the longitudinal grooves 2 and the lateral grooves 3 clearly remain with the tie bar 5 portions being left also in the end stage of wear (at least 50% depth wear). The groove widths of the respective groove bottoms are set to be approximately 50 to 90% of the groove widths on the tread surface. With such settings, the wet grip performances and steering stability (particularly straight-ahead running stability) can be achieved by securing edge components at the end stage and by improving block rigidity of the crown portions. In this respect, the groove width is measured in a direction orthogonal to the groove central line.

Next, in the third invention, edge component lengths comprised by circumferential edges at respective stages of wear of the blocks 4 of the tread pattern are balanced to satisfy the following 6 equations.

$$EC50 > EC00 \quad (1)$$

$$EC90 > EC00 \quad (2)$$

$$EL50 > 0.5 \times EL00 \quad (3)$$

$$EL90 > 0.5 \times EL00 \quad (4)$$

$$1.5 < EC50/EL50 < 2.2 \quad (5)$$

$$2.5 < EC90/EL90 < 3.5 \quad (6)$$

The term "tread surface TS" denotes a tread surface that grounds on the road surface at respective stages, that is, in a new condition or upon wear. In this respect, it is assumed to be a tread surface at respective stages in which wear has progressed normally. The tread surface of a new product is defined to be TS00, the tread surface upon 50% wear TS50 and the tread surface upon 90% wear TS90. Further, the term "outline at which the tread surface intersects with the peripheral wall of the block" denotes an intersecting line with the tread surface TS that is expected in the wear condition of the block and the periphery of the block. The block entire circumferential edge e is a total length of this outline.

The tread surface TS is a region between the tread ends E, E. Thus, the term "block entire circumferential edge e" indicates a block edge that is located in the tread surface 2. Accordingly, where the block 4 runs off the tread ends E, circumferential edges located outside of the tread surface 2 will be eliminated from the block entire portion circumferential edge e.

Figure 11:
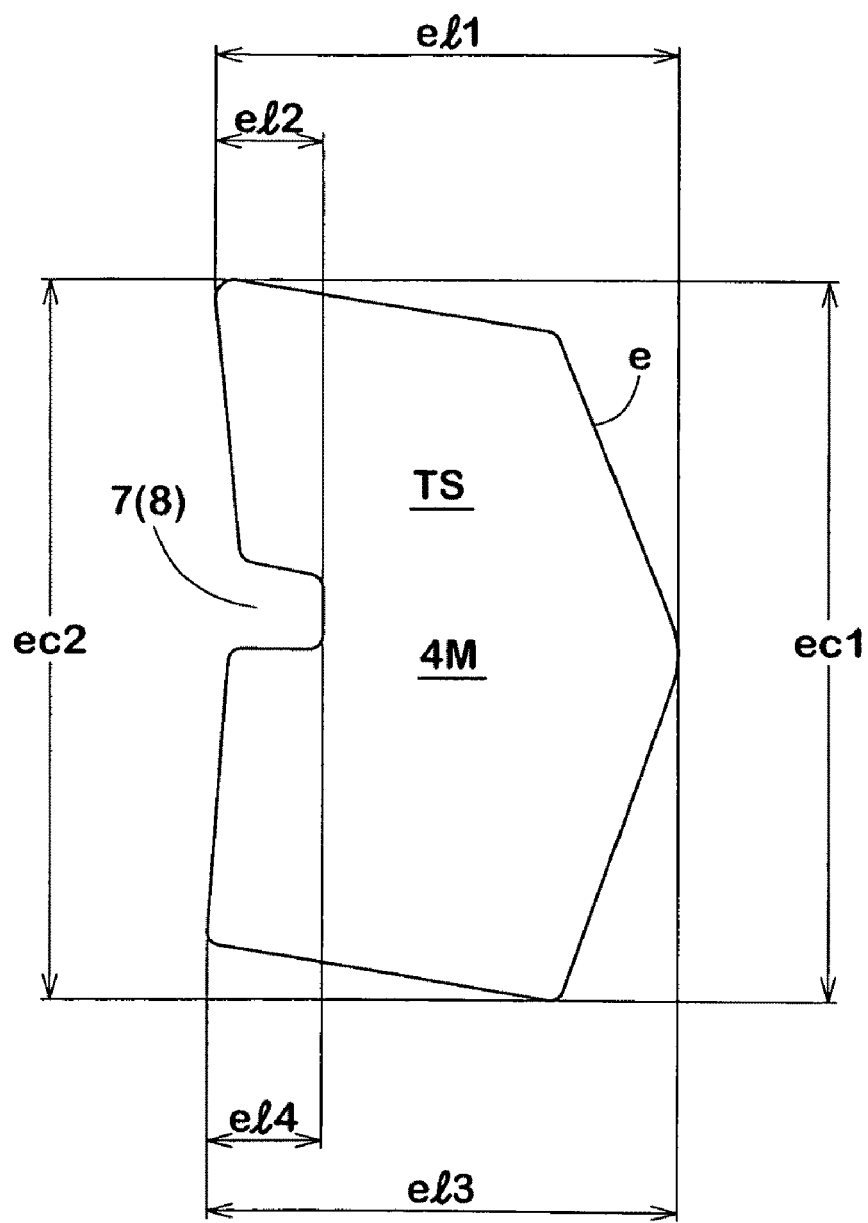
FIG. 11 is a plan view for explaining a circumferential edge component and an axial edge component of a block portion circumferential edge.

From the block entire circumferential edge e, the concepts of circumferential edge components ec in the tire circumferential direction and axial edge components el in the tire axial direction are taken out. As illustrated in FIG. 11 with the intermediate block 4M as an example, the term "total circumferential edge component ec" denotes a sum of length ec1, ec2 ... where a block circumferential edge e is projected from one side and the other side in the tire axial direction onto the tire circumferential surface (surface parallel to the tire equator). The term "total axial edge component el" denotes a sum of lengths el1, el2 ... where block entire circumferential edges e are respectively projected from one side and the other side in the tire circumferential direction onto the tire circumferential surface (surface parallel to the tire axial direction).

The total circumferential edge component EC in a new condition Y00 of the tread surface TS00 of a new product is defined to be EC00, and its total axial edge component is defined to be EL00. The total circumferential edge component EC in "50% wear condition Y50" on the tread surface TS50 in the 50% wear condition is defined to be EC50 while the total axial edge components are defined to be EL50. The total circumferential edge component EC in "90% wear condition Y90" on the tread surface TS90 in the 90% wear condition is defined to be EC90 while the total axial edge components are defined to be EL90. At this time, the above equations (1) to (6) are satisfied.

Figure 12:
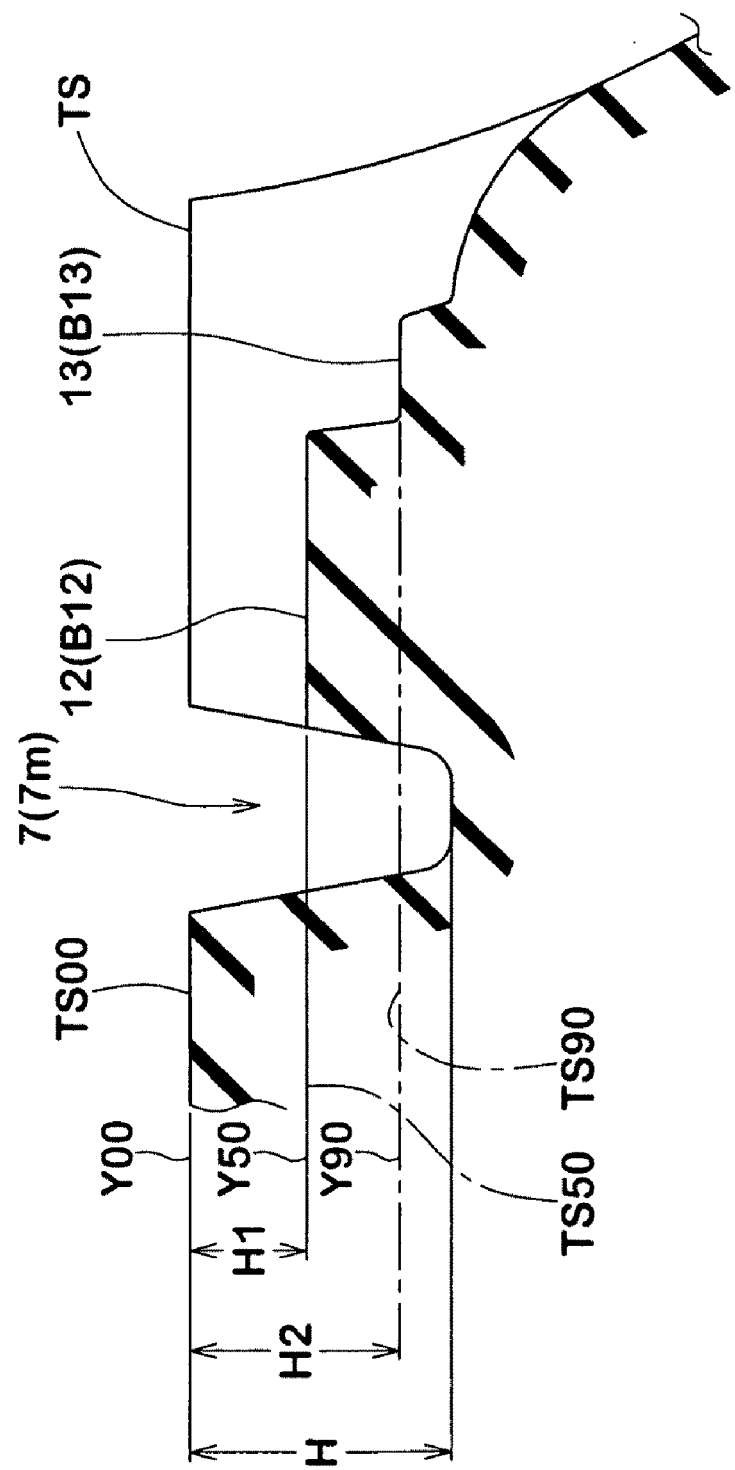
FIG. 12 is a sectional view for explaining a condition of a new product, a 50% wear condition and a 90% wear condition.

At this time, a "50% wear condition Y50" denotes a wear of condition as illustrated in FIG. 12 in which 50% of the groove depth H of the deepest tread grooves 7m from among the aforesaid tread grooves 7 comprising the longitudinal grooves 2 and lateral grooves 3. A "90% wear condition Y90" denotes a condition in which 90% of the groove depth H wear. In the present embodiment, the longitudinal grooves 2C, 2M and 2S comprise the deepest tread grooves 7m.

The inventors of the present invention have found out through studies that the total circumferential edge components EC are important in view of turning properties that particularly counts in view of wet performances. This is due to the fact that the total circumferential edge components EC need to be rather increased than those of a new product accompanying progress of wear for maintaining the wet performances as high as those of a new product. While wet performances are important over the entire range from a new condition up to the end stage of wear, the groove volume is inevitably reduced accompanying the progress of wear. It is accordingly necessary to compensate decreases in groove volume through increasing the total circumferential edge components EC. Therefore, the total circumferential edge components EC50, EC90 of the respective conditions of wear Y50, Y90 are increased than the total edge component EC00 of a new product in equations (1) and (2). At this time, while the relationship between EC50 and EC90 is not particularly restricted, it is desirable that $EC50 \leq EC90$ and further $EC50 \leq EC90$ is satisfied.

In view of traction performances that particularly count in view of on-snow performances, total axial edge components EL will be important, and it is desirable that this is large, similar to the total circumferential edge component EC. However, on-snow performances up to 50% wear are secured in winter tires. Therefore, on-snow performances after 50% wear need not be as highly secured as the wet performances. Accordingly, total axial edge components EL50, EL90 in respective conditions of wear Y50, Y90 are increased by more than 0.5 times the total axial edge components EL00 of a new product in equations (3), (4). At this time, in view of EL50 and EL90, it is desirable to secure EL90 to be not less than 0.6 times of EL50 and further not less than 0.7 times for the purpose of improving on-snow performance after 90% wear as much as possible.

In this respect, in a conventional tire, total circumferential edge components EC90 in the 90% wear condition Y90 is not more than 80% of the total circumferential edge component EC00 (condition Y00 of a new product) and total axial edge components EL90 is not more than 30% of the total axial edge component EL00 (condition Y00 of a new product), and thus extremely low.

As explained above, the importance of on-snow performances and wet performances differ accompanying progress of wear as can be seen from the fact that the on-snow performances after 50% wear does not need to be secured as high as the wet performances. Accordingly, for exhibiting on-show performances and wet performances in a totally balanced manner, it will be required to balance the ratio EC/EL between the total circumferential edge components EC and the total axial edge components EL at respective stages of wear Y50, Y90. EC50/EL50 and EC90/EL90 are thus restricted to be within specific ranges in equations (3) and (4).

In this respect, where the above ratio EC50/EL50 is smaller than 1.5, the wet performance at the 50% wear stage will be degraded. This is due to the fact that edge components in the circumferential direction are relatively reduced so that the grip force at the time of performing turning is reduced. On the other hand, when it is larger than 2.2, on-snow performances at the stage of 50% wear will be degraded. This is due to the fact that the axial edge components are relatively reduced and the traction performances at the time of start on snow are degraded. The lower limit value for the ratio EC50/EL50 is thus preferably not less than 2.0.

Where the ratio EC90/EL90 is smaller than 2.5, wet performances at the stage of 90% wear are degraded. This is due to the fact that edge components in the circumferential direction are relatively reduced so that the grip force at the time of performing turning is reduced. On the other hand, when it is larger than 3.5, not only on-snow performances at the stage of 90% wear but also wet performances will be degraded. The lower limit value for the ratio EC90/EL90 is thus preferably not less than 2.7 while the upper limit value is preferably not more than 3.4.

For satisfying the above equations (1) to (6), the present embodiment is arranged in that the tread grooves 7 are formed with 50% wear groove portions 12 that wear in the 50% wear condition Y50 and 90% wear groove portions 13 that wear in the 90% wear condition Y90.

The 50% wear groove portions 12 wear in the 50% wear condition Y50 since they are shallower than the deepest tread grooves 7m. As a result, their groove bottoms B12 comprise the shallow groove portions that are exposed to the tread surface TSS50 in the 50% wear condition Y50. More particularly, as shown in FIG. 12, its groove depth H1 is not more than 50% of the deepest groove depth H. However, when it is too shallow, it will wear at an early stage so that the effects of the present invention cannot be sufficiently exhibited so that the groove depth H1 is set to 40 to 50%, and preferably 45 to 50% of the deepest groove depth H. Further, the 90% wear groove portions 13 are shallow groove portions which groove bottoms B13 are exposed to the tread surface 90 in the 90% wear condition Y90. Its groove depth H2 is set to not more than 90%, preferably 80 to 90%, and more preferably to 85 to 90% of the deepest groove depth H.

Figure 10:
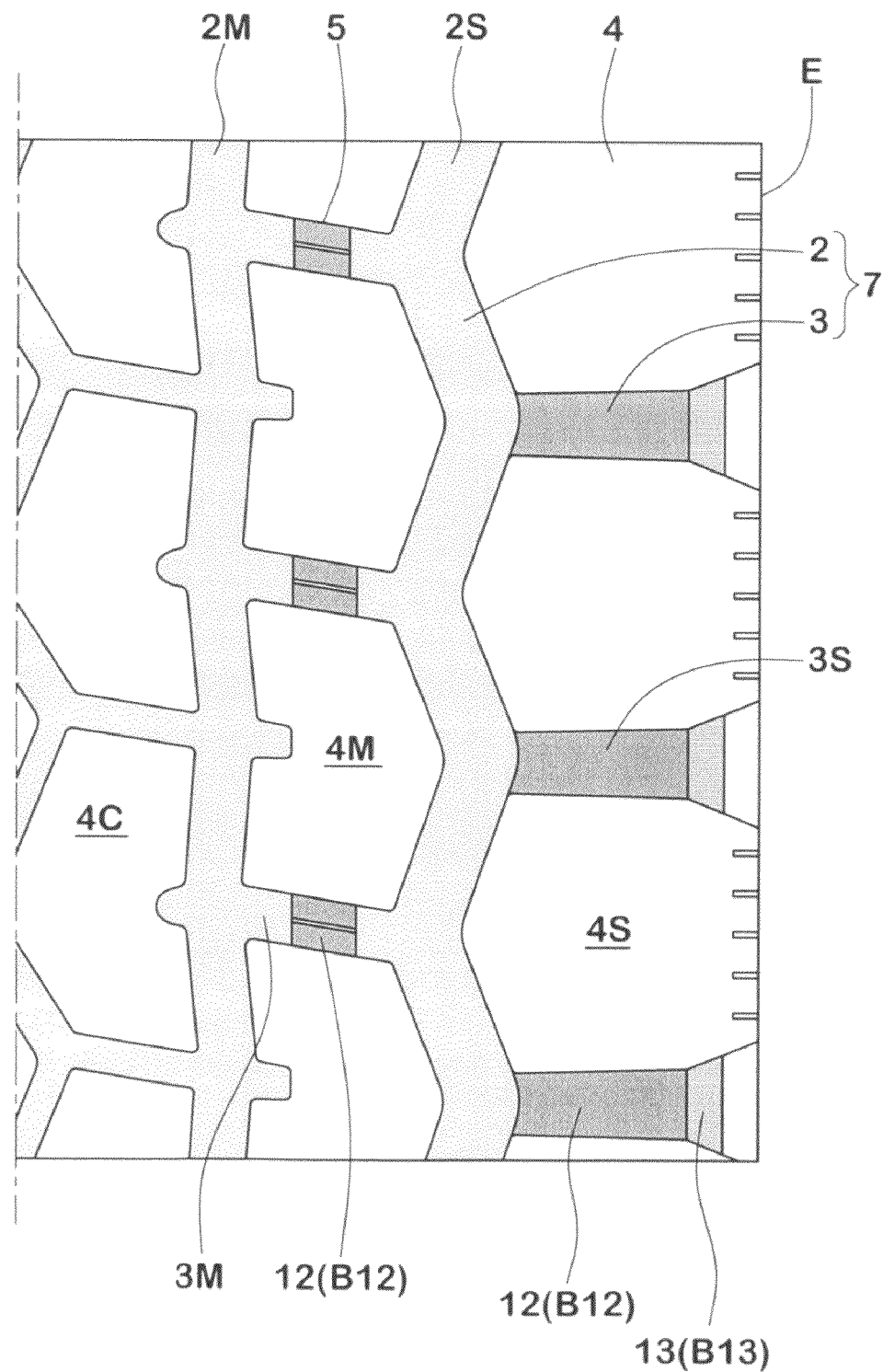
FIG. 10 is a planar development view illustrating groove depths by enlarging a right-hand side of FIG. 1.

The wear groove portions 12, 13 can be provided at suitable positions of the longitudinal grooves 3 and lateral grooves 4 and the entire of a single longitudinal groove 3 and the lateral groove 4 may be formed as the wear groove portions 12, 13. In the present embodiment, the 50% wear groove portions 12 are formed on the central portion sides of the intermediate lateral grooves 3M and on the inner end sides of the outer lateral grooves 3S in the tire axial direction as illustrated in FIG. 10. There is also illustrated an arrangement in which the 90% wear groove portions 13 are adjoining, from outside in the tire axial direction, the 50% wear groove portions 12 provided at outer end portions of the outer lateral grooves 3S.

Figure 13A:
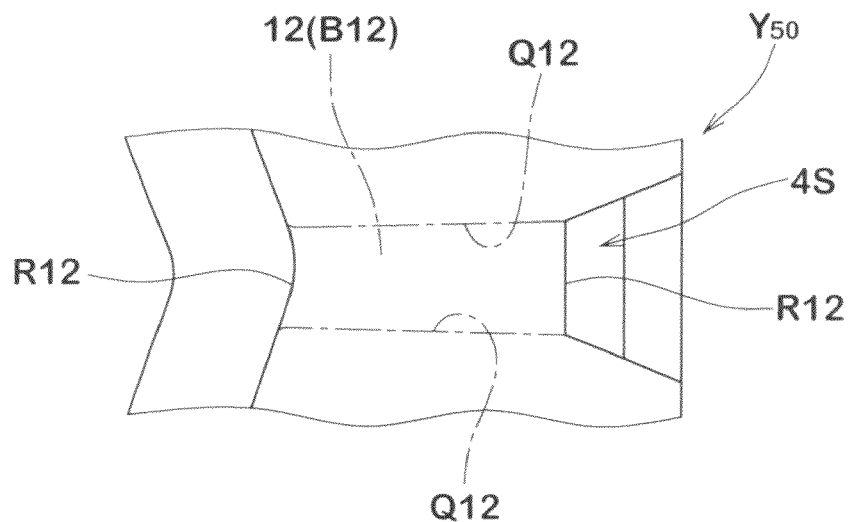
FIG. 13(A) and FIG. 13(B) are plan views for explaining increase and decrease of edge components through wear groove portions.
Figure 13B:
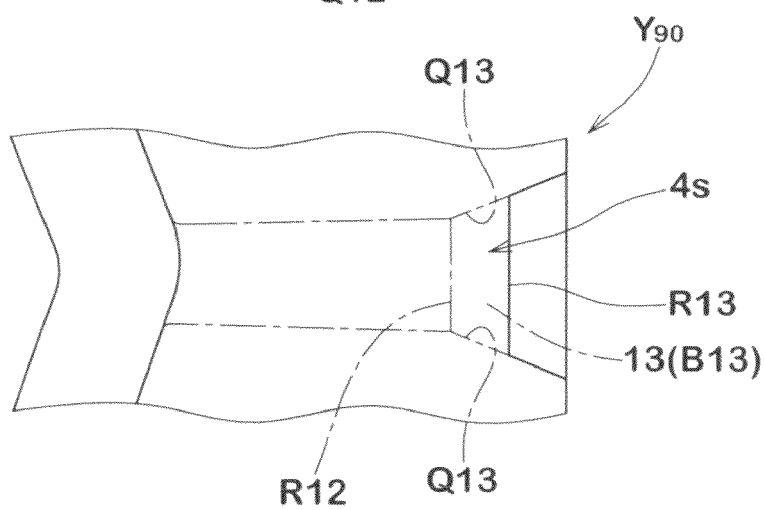

Changes caused through wear are illustrated in FIG. 13(A) taking the case of the outer lateral grooves 3S as an example. Where wear has progressed so that the 50% wear condition Y50 has been reached, the groove bottoms B12 of the 50% wear groove portions 12 are exposed. Accordingly, groove side edges Q12 of the 50% wear groove portions 12 are vanished while it is possible to make both end edges R12 of the groove bottoms B12 appear. When wear further progresses so that the 90% wear condition Y90 has been reached, the groove bottoms B13 of the 90% wear groove portions 13 are exposed at the tread surface TS90 as illustrated in FIG. 13(B). The groove side edges Q13 of the 90% wear groove portions 13 are then vanished. As a result, it is possible to make end edges R13 of the groove bottoms B13, which are longer than the end edges R12, appear instead of the end edges R12.

When these grooves disappeared, the outer blocks 4S becomes a shape of continuous land, in this case.

Figure 14:
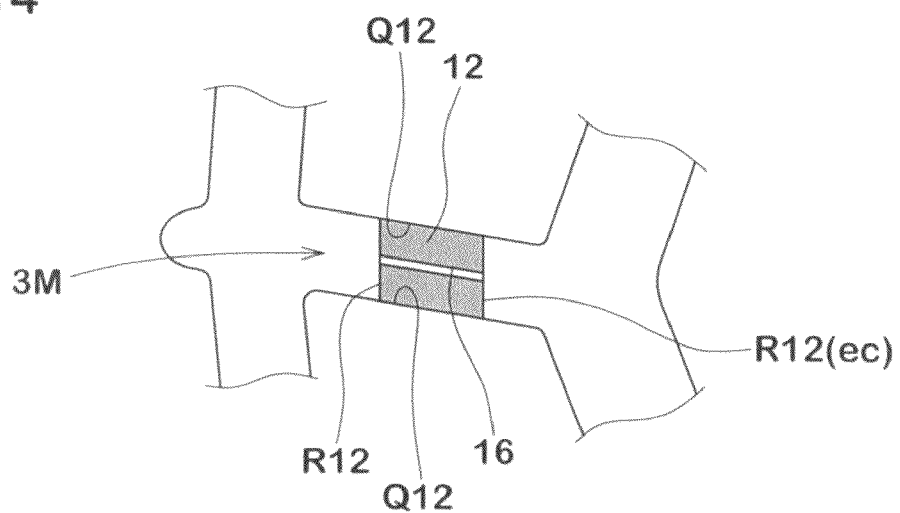
FIG. 14 illustrating narrow grooves.
Figure 15A:
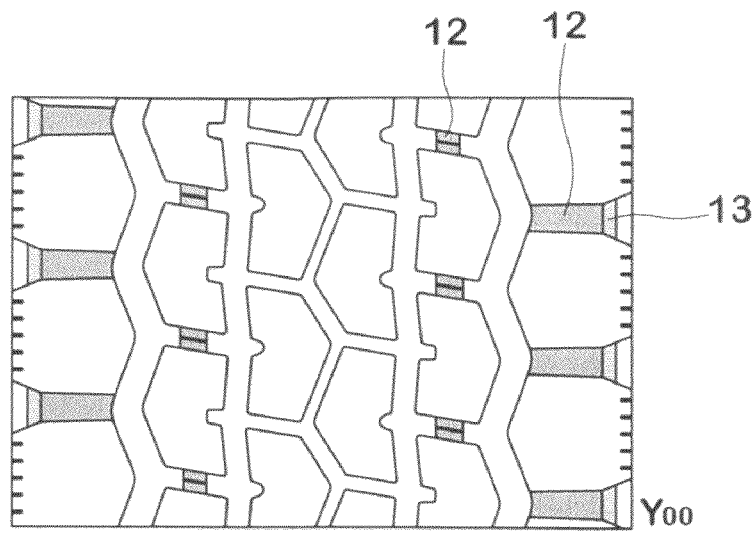
FIG. 15 (A), (B), (C) are planar development views illustrating conditions of tread surfaces at respective wear conditions of the tire according to Example 1 in Table 5.
Figure 15B:
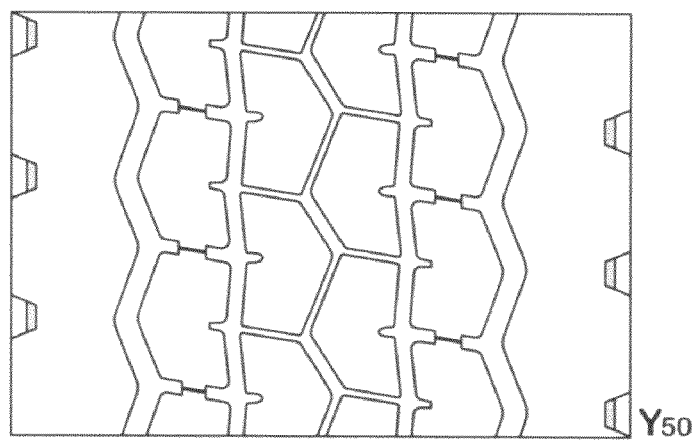
Figure 15C:
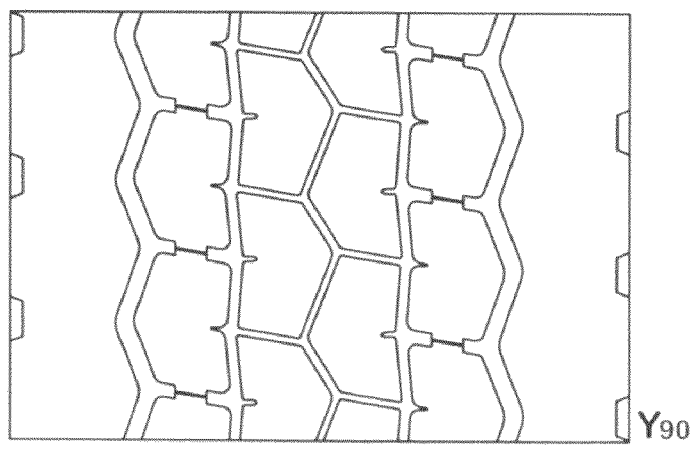
Figure 16A:
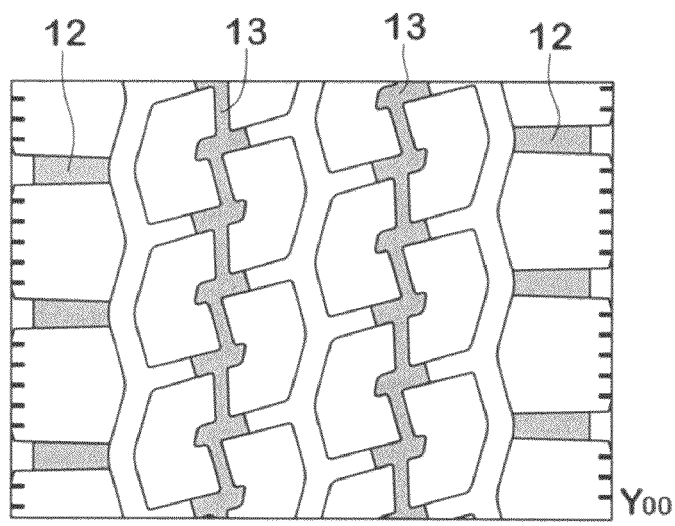
FIG. 16 (A), (B), (C) are plan development views illustrating conditions of tread surfaces at respective wear conditions of the tire according to Comparative Example 1 in Table 5.
Figure 16B:
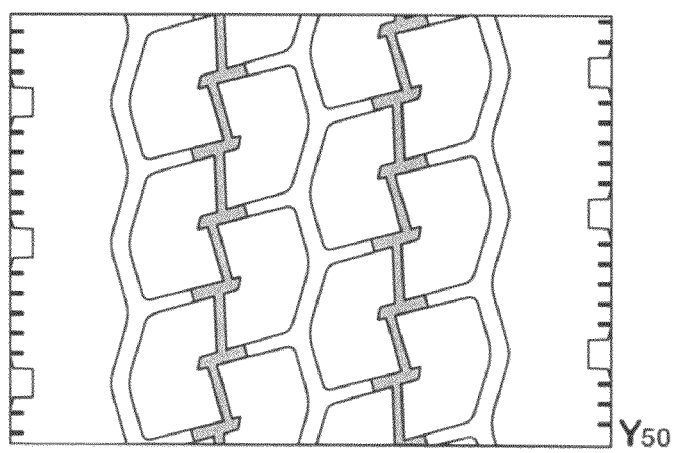
Figure 16C:
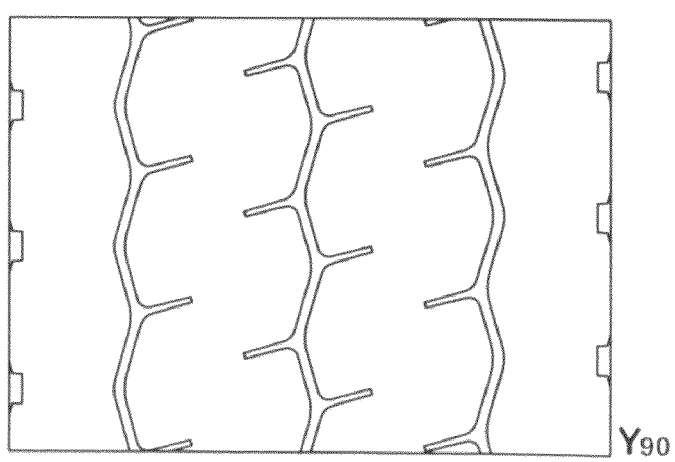

In this manner, the wear groove portions 12, 13 can freely expel edges which are the side edges and the end edges accompanying the progress of wear so that it is possible to satisfy the equations (1) to (6). In this respect, as illustrated in FIG. 14, the 50% wear groove portions 12 provided at the intermediate lateral grooves 3M are formed with the sipings 16 on the groove bottoms B12 that are parallel to the lateral grooves 3M. In such an instance, it is possible to increase circumferential edge components ec comprised by both end edges R12 by, for instance, canceling the loss of groove side edges Q12 by the appearance of the narrow grooves 16.

In this respect, the heavy duty pneumatic tire according to the present invention is not limited to the above-described arrangement but may be variously varied within the scope as recited in the claims.

Embodiment 1

Heavy duty pneumatic tires with a size of 11R22.5 and with a tread pattern as illustrated in FIG. 1 were manufactured (Table 1) and respective performances have been evaluated. Results of evaluation are indicated in Table 3. In this respect, r coefficients are listed in Table 2.

Various test conditions as illustrated in Table 1 were as follows. In each of the tests, the rim size was 7.50×22.5, the internal pressure 800 kPa and the vehicle employed was a domestic 10 ton truck 2-D vehicle (half loaded on the front half of the truck box).
(1) WET Turning Performances
Place: Okayama Test Course of Sumitomo Rubber Industries, Ltd.
Method: Lap times of a single lap on the course of a radius of 30 m in a wet condition were represented as reciprocates of ratios with respect to the Comparative Example 1. The value of the Comparative Example 1 was defined to be 100, and the larger the value is, the more favorable it is.
(2) WET Traction Performances
Place: Okayama Test Course of Sumitomo Rubber Industries, Ltd.
Method: Times of a specified zone on the course in a wet condition were represented as reciprocates of ratios with respect to the Comparative Example 1. The value of the Comparative Example 1 was defined to be 100, and the larger the value is, the more favorable it is.
(3) WET Brake Performances
Place: Okayama Test Course of Sumitomo Rubber Industries, Ltd.
Method: A road surface region in a wet condition was entered at a velocity of 60 km/h, and distances traveled from braking up to halt were represented as reciprocates of ratios with respect to the Comparative Example 1. The value of the Comparative Example 1 was defined to be 100, and the larger the value is, the more favorable it is.

(4) Noise Test

Place: Anechoic vehicle institute of Sumitomo Rubber Industries, Ltd.

Method: A drum type noise measuring device was employed. Generated noises were measured at a microphone position of 7.5 m at 70 km/h.

Rim size: 7.50×22.5

Internal pressure: 800 kPA (5) Deflected Wear Resisting Performances

Running was performed by using a 2-D4 type box-type truck and the running distance at which deflected wear was caused that necessitated position exchanges were obtained as index ratios with that of the tire of the Comparative Example 1 being defined as 100.

(6) Wear Resisting Performances 40,000 km was traveled with a 2-D4 type box-type truck under a loading condition of constant load (10 t). Wear resisting performance indices were calculated on the basis of remaining grooves after completion of running for comparison. In this test, the wear resisting performance index is an index ratio of the value of (groove depth of new product groove depth after wear) in the test tire to 100 for the tire of Comparative Example 1.

TABLE 1

|  |  | Example 1 | Example 2 | Comparative Example 1 | Comparative Example 2 | Comparative Example 3 |
|---|---|---|---|---|---|---|
| Grounding width | WT [mm] | 222 | 222 | 222 | 222 | 222 |
| Longitudinal | L4C [mm] | 48.0 | 48.0 | 48.2 | 48.0 | 46.1 |
| length of block | L4M [mm] | 46.0 | 46.0 | 46.0 | 48.1 | 50.0 |
|  | L4S [mm] | 41.0 | 41.0 | 41.0 | 41.0 | 41.0 |
| Lateral length | W4C [mm] | 29.0 | 30.0 | 29.5 | 29.5 | 29.5 |
| of block | W4M [mm] | 30.0 | 30.0 | 30.0 | 30.0 | 30.2 |
|  | W4S [mm] | 41.5 | 41.5 | 41.5 | 41.5 | 41.5 |
| Longitudinal/ | L4C/W4C | 1.66 | 1.60 | 1.63 | 1.66 | 1.56 |
| lateral ratio | L4M/W4M | 1.53 | 1.53 | 1.53 | 1.60 | 1.66 |
| of block | L4S/W4S | 0.98 | 0.98 | 0.98 | 0.98 | 0.98 |
| Longitudinal | w2C [mm] | 6.0 | 6.0 | 7.0 | 6.0 | 6.0 |
| groove width | w2M [mm] | 8.0 | 7.0 | 6.0 | 8.0 | 8.0 |
|  | w2S [mm] | 10.0 | 10.0 | 10.0 | 10.0 | 8.0 |
| Longitudinal | w2C/WT | 0.027 | 0.027 | 0.032 | 0.027 | 0.027 |
| groove width/ | w2M/WT | 0.036 | 0.032 | 0.027 | 0.036 | 0.036 |
| grounding width | w2S/WT | 0.045 | 0.045 | 0.045 | 0.045 | 0.036 |
| Lateral groove | w3C [mm] | 5.0 | 5.0 | 5.0 | 5.0 | 7.0 |
| width | w3M [mm] | 8.0 | 8.0 | 8.0 | 6.0 | 6.0 |
|  | w3S [mm] | 10.0 | 10.0 | 10.0 | 10.0 | 10.0 |
| Groove width | w3C/WT | 0.023 | 0.023 | 0.023 | 0.023 | 0.032 |
| of lateral groove/ | w3M/WT | 0.036 | 0.036 | 0.036 | 0.027 | 0.027 |
| grounding width | w3S/WT | 0.045 | 0.045 | 0.045 | 0.45 | 0.45 |
| (Longitudinal | w2C/w3C | 1.2 | 1.2 | 1.4 | 1.2 | 0.86 |
| groove width/ | w2M/w3M | 1.0 | 0.875 | 0.75 | 1.3 | 1.3 |
| lateral groove width) Groove width ratio | w2S/w3S | 1.0 | 1.0 | 1.0 | 1.0 | 0.8 |
| Longitudinal | α2C | 23 | 23 | 23 | 23 | 23 |
| groove angle | α2M [deg] | 5.5 | 5.5 | 5.5 | 5.5 | 5.5 |
|  | α2S [deg] | 20 | 20 | 20 | 20 | 20 |

TABLE 2

|  |  | Example 1 | Example 2 | Comparative Example 1 | Comparative Example 2 | Comparative Example 3 |
|---|---|---|---|---|---|---|
| Radius of | rC [mm] | 3.0 | 3.0 | 4.0 | 3.0 | 5.0 |
| curvature | rM [mm] | 8.0 | 8.0 | 10.0 | 8.0 | 12.0 |
| of block | rS [mm] | 10.0 | 10.0 | 10.0 | 10.0 | 15.0 |
| projecting | r4C | 0.080 | 0.079 | 0.106 | 0.080 | 0.136 |
| end | r4M | 0.215 | 0.215 | 0.269 | 0.211 | 0.309 |
| portion | r4S | 0.244 | 0.244 | 0.243 | 0.243 | 0.364 |

TABLE 3

|  | Example 1 | Example 2 | Comparative Example 1 | Comparative Example 2 | Comparative Example 3 |
|---|---|---|---|---|---|
| WET turning performance | 115 | 108 | 100 | 98 | 98 |
| WET traction performance | 110 | 112 | 100 | 102 | 96 |
| WET brake performance | 108 | 110 | 100 | 102 | 98 |
| Noise test result | 68.0 dB | 67.0 dB | 68.0 dB | 67.0 dB | 66.8 dB |

TABLE 3-continued

|  | Example 1 | Example 2 | Comparative Example 1 | Comparative Example 2 | Comparative Example 3 |
|---|---|---|---|---|---|
| Deflected wear resisting performance | 103 | 102 | 100 | 102 | 102 |
| Wear resisting performance | 102 | 101 | 100 | 102 | 101 |

Embodiment 2

Heavy duty pneumatic tires with a size of 11R22.5 and with a tread pattern as illustrated in FIG. 1 were manufactured and respective performances have been evaluated. Results of evaluation are indicated in Table 4. Various test conditions as illustrated in Table 4 were as follows. In each of the tests, the rim size was 7.50×22.5, the internal pressure 800 kPa and the vehicle employed was a domestic 10 ton truck 2-D4 vehicle (half loaded on the front half of the truck box).
(1) WET Grip Performances
Place: Okayama Test Course of Sumitomo Rubber Industries, Ltd.
Method: Lap times of a single lap on the course of a radius of 30 m in a wet condition were represented as reciprocates of ratios with respect to the Comparative Example 1. The value of the Comparative Example 1 was defined to be 100, and the larger the value is, the more favorable it is.
(2) Deflected Wear Resisting Performances
Running distance: 40,000 km
Method of evaluation: 40,000 km was traveled with a 2-D4 type box-type truck under a loading condition of constant load (10 t). Wear resisting performance indices were calculated on the basis of remaining grooves after completion of running for comparison.

Wear-resisting properties index: the values of (groove depth of new product groove depth after wear)/(groove depth of new product) of the test tires were compared with those values of a control tire.

TABLE 4

|  |  | Example 1 | Example 2 | Example 3 | Comparative Example 1 | Comparative Example 2 |
|---|---|---|---|---|---|---|
| Grounding width WT [mm] | | 222 | 222 | 222 | 222 | 222 |
| Central block width | W4Cmax [mm] | 29.0 | 29.0 | 29.0 | 29.0 | 31.0 |
|  | W4Cmin [mm] | 18.0 | 20.0 | 18.0 | 18.0 | 16.5 |
|  | W4max/W4Smin | 1.61 | 1.45 | 1.61 | 1.61 | 1.88 |
| Intermediate block width | W4Mmax [mm] | 30.0 | 30.0 | 30.0 | 30.0 | 30.0 |
|  | W4Mmin [mm] | 22.0 | 22.0 | 22.0 | 22.0 | 22.0 |
|  | W4Mmax/W4Mmin | 1.36 | 1.36 | 1.36 | 1.36 | 1.36 |
| Shoulder block width | W4Smax [mm] | 41.5 | 41.5 | 41.5 | 41.5 | 41.5 |
|  | W4Smin [mm] | 35.0 | 35.0 | 32.5 | 35.0 | 35.0 |
|  | W4Smax/W4Smin | 1.19 | 1.19 | 1.28 | 1.19 | 1.19 |
| Tie bar | Tire axial distance W5 [mm] | 10.0 | 10.0 | 10.0 | — | 5.0 |
|  | Depth D5 [mm] | 8.0 | 4.5 | 11.0 | — | 8.0 |
| Sipings | Width W6 [mm] | 1.0 | 1.0 | 1.5 | — | 1.0 |
|  | Depth D6 [mm] | 9.0 | 12.5 | 6.0 | — | 9.0 |
| Intermediate lateral groove width W3M [mm] | | 8.0 | 8.0 | 8.0 | 8.0 | 8.0 |
| W5/W3M | | 1.25 | 1.25 | 1.25 | — | 0.625 |
| D5/D3M | | 0.47 | 0.26 | 0.65 | — | 0.47 |
| D6/(D3M-D5) | | 1.00 | 0.95 | 1.00 | — | 1.00 |
| Longitudinal groove angle | α2C [deg] | 23 | 23 | 23 | 23 | 23 |
|  | α2M [deg] | 5.5 | 5.5 | 5.5 | 5.5 | 5.5 |
|  | α2S [deg] | 20 | 20 | 20 | 20 | 20 |
| Wet grip performance | | 103 | 99 | 101 | 100 | 102 |
| Wear resisting performance [mm] (amount of occurrence of heel and toe) | | | | | | |
| central block 4C | | 1.5 | 1.2 | 1.5 | 3.0 | 3.5 |
| intermediate block 4M | | 2.4 | 2.1 | 2.6 | 3.1 | 2.2 |
| shoulder block 4S | | 2.1 | 2.1 | 2.3 | 2.7 | 2.6 |
| average value | | 2.0 | 1.8 | 2.1 | 2.9 | 2.8 |

Embodiment 3

Heavy duty pneumatic tires with a size of 11R22.5 and with a tread pattern as illustrated in FIG. 1 were manufactured according to specifications of Table 5 and on-snow performances and wet performances of the respective sample tires were evaluated respective in a new condition, a 50% wear condition, and a 90% wear condition, and the results are indicated in Table 5.

In this respect, respective values of EL00, EL50, and EL90 in Table 5 are represented in the Comparative Example 1 as indices with the length L1 of the total axial edge component of a new product of Comparative Example 1 being defined as 100. Similarly, such values are represented in the Comparative Example 2 as indices with the length L2 of the total axial edge component of a new product of Comparative Example 2 being defined as 100, in Example 1 as indices with the length L3 of the total axial edge component of a new product of Example 1 being defined as 100, and in the Example 3 as indices with the length L4 of the total axial edge component of a new product of Example 3 being defined as 100, respectively.

Further, respective values of EC00, EC50, and EC90 in Table 1 are represented in the Comparative Example 1 as indices with the length C1 of the total circumferential edge component of a new product of Comparative Example 1 being defined as 100. Similarly, such values are represented in the Comparative Example 2 as indices with the length C2 of the total circumferential edge component of a new product of Comparative Example 2 being defined as 100, in Example 1 as indices with the length C3 of the total circumferential edge component of a new product of Example 1 being defined as 100, and in the Example 3 as indices with the length C4 of the total circumferential edge component of a new product of Example 3 being defined as 100, respectively.

Tread surface conditions at respective wear conditions of the tire of Example 1 are illustrated in FIG. 7, and tread surface conditions at respective wear conditions of the tire of Comparative Example 1 are illustrated in FIG. 8.

(1) On-Snow Performances

Tires were mounted to all wheels of a vehicle (a 2-D vehicle with a maximum load of 8 t) under the following conditions for the rim (7.50×22.5) and the internal pressure (800 kPa), the vehicle was started from a halting condition in a constant load condition on an ascent of 10% degrees in a compacted snow condition, and times until 10 m was traveled were measured in the respective wear conditions (new condition, 50% wear condition, 90% wear condition). For each of the wear conditions, reciprocals of the measured times were represented as indices with that of the Comparative Example 1 being defined as 100. The larger the value is, the more superior the traction performance on snow is.

(2) Wet Performance

The same vehicle as above was employed for measuring lap times of a single lap on a course of a radius of 30 m in a wet condition in respective wear conditions, and values were represented for each wear condition as indices with reciprocates of measured times with that of the Comparative Example 1 being defined as 100. The larger the value is, the more favorable the wet performance is.

TABLE 5

| | Comparative Example 1 | Comparative Example 2 | Example 1 | Example 2 |
|---|---|---|---|---|
| Land portion circumferential edge component length | | | | |
| EL00 | 100 | 100 | 100 | 100 |
| EL50 | 60 | 63 | 65 | 70 |
| EL90 | 30 | 31 | 50 | 55 |
| EC00 | 100 | 100 | 100 | 100 |
| EC50 | 112 | 112 | 111 | 120 |
| EC90 | 80 | 74 | 112 | 120 |
| Ratio EC50/EL50 | 2.55 | 2.38 | 2.16 | 2.1 |
| Ratio EC90/EL90 | 2.2 | 3.16 | 2.85 | 3.4 |
| Condition of a new product: | | | | |
| on-snow performance | 100 | 100 | 102 | 103 |
| wet performance | 100 | 100 | 103 | 103 |
| 50% wear condition: | | | | |
| on-snow performance | 100 | 101 | 105 | 104 |
| wet performance | 100 | 99 | 108 | 109 |

TABLE 5-continued

| | Comparative Example 1 | Comparative Example 2 | Example 1 | Example 2 |
|---|---|---|---|---|
| 90% wear condition: | | | | |
| on-snow performance | 100 | 102 | 107 | 108 |
| wet performance | 100 | 99 | 111 | 110 |

What is claimed is:

1. A heavy duty pneumatic tire comprising:
a tread portion provided with tread grooves including
at least five longitudinal grooves including a central longitudinal groove extending in a zigzag manner, intersecting a tire equator, two outer longitudinal grooves disposed one on each side of the central longitudinal groove, and two intermediate longitudinal grooves disposed one between each said outer longitudinal groove and the central longitudinal groove, and
central lateral grooves extending between the central longitudinal groove and the intermediate longitudinal grooves, intermediate lateral grooves extending between the intermediate longitudinal grooves and the outer longitudinal grooves, and outer lateral grooves extending from the outer longitudinal grooves 2S to tread ends so as to form a block pattern made up of blocks including central blocks delimited by the central longitudinal groove, the intermediate longitudinal grooves and the central lateral grooves, intermediate blocks delimited by the intermediate longitudinal grooves, the outer longitudinal grooves and the intermediate lateral grooves, and outer blocks delimited by the outer longitudinal grooves, the outer lateral grooves and the tread ends, wherein
the total length EC00 of circumferential components and the total length EL00 of axial components of edges of the blocks at the tread surface in a new condition when the tread portion is not worn,
the total length EC50 of circumferential components and the total length EL50 of axial components of edges of the blocks at the tread surface in a 50% wear condition when the tread portion is worn out to 50% of a deepest depth of the tread grooves, and
the total length EC90 of circumferential components and the total length EL90 of axial components of edges of the blocks at the tread surface in a 90% wear condition when the tread portion is worn out to 90% of said deepest depth
satisfy the following six equations:

$$EC50 > EC00 \tag{1}$$

$$EC90 > EC00 \tag{2}$$

$$EL50 > 0.5 \times EL00 \tag{3}$$

$$EL90 > 0.5 \times EL00 \tag{4}$$

$$1.5 < EC50/EL50 < 2.2 \tag{5}$$

$$2.5 < EC90/EL90 < 3.5 \tag{6}.$$

2. The heavy duty pneumatic tire as claimed in claim 1, wherein the tread grooves comprise 50% wear groove portions that vanish upon wear in the 50% wear condition and 90% wear groove potions that vanish upon wear in the 90% wear condition.

3. The heavy duty pneumatic tire as claimed in claim 1, wherein the 50% wear groove portions and the 90% wear groove portions are provided in the groove bottoms thereof with narrow grooves.

* * * * *